(12) United States Patent  
Ott

(10) Patent No.: US 8,457,461 B2
(45) Date of Patent: Jun. 4, 2013

(54) FIBER OPTIC CABLE ASSEMBLY AND METHOD OF MAKING THE SAME

(75) Inventor: Michael James Ott, Le Sueur, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 231 days.

(21) Appl. No.: 13/087,807

(22) Filed: Apr. 15, 2011

(65) Prior Publication Data

US 2011/0262084 A1  Oct. 27, 2011

Related U.S. Application Data

(60) Provisional application No. 61/325,133, filed on Apr. 16, 2010.

(51) Int. Cl.
*G02B 6/44* (2006.01)

(52) U.S. Cl.
USPC .......................................... 385/103; 385/113

(58) Field of Classification Search
USPC .......................................... 385/103, 107, 113
See application file for complete search history.

(56) References Cited

U.S. PATENT DOCUMENTS

| | | | |
|---|---|---|---|
| 5,185,840 A | 2/1993 | Iapicco | |
| 5,253,315 A | 10/1993 | Fentress | |
| 5,491,766 A | 2/1996 | Huynh et al. | |
| 5,588,082 A | 12/1996 | Whitesmith | |
| 5,915,055 A * | 6/1999 | Bennett et al. | 385/59 |
| 5,925,462 A | 7/1999 | Girgis | |
| 6,379,054 B2 | 4/2002 | Throckmorton et al. | |
| 6,389,214 B1 | 5/2002 | Smith et al. | |
| 6,438,300 B1 * | 8/2002 | Bernstein et al. | 385/100 |
| 6,439,780 B1 | 8/2002 | Mudd et al. | |
| 6,771,861 B2 | 8/2004 | Wagner et al. | |
| 7,104,702 B2 | 9/2006 | Barnes et al. | |
| 7,192,194 B2 | 3/2007 | Giotto et al. | |
| 7,216,512 B2 | 5/2007 | Danley et al. | |
| 7,228,047 B1 | 6/2007 | Szilagyi et al. | |
| 7,264,401 B2 | 9/2007 | Johnson | |
| 7,264,410 B1 | 9/2007 | Doss et al. | |
| 7,270,485 B1 | 9/2007 | Robinson et al. | |
| 7,270,487 B2 | 9/2007 | Billman et al. | |
| 7,281,859 B2 | 10/2007 | Mudd et al. | |
| 7,329,049 B2 | 2/2008 | Meek et al. | |

(Continued)

FOREIGN PATENT DOCUMENTS

| | | |
|---|---|---|
| JP | 2001-330765 | 11/2001 |
| KR | 10-2009-0116650 | 11/2009 |

OTHER PUBLICATIONS

Celanex® thermoplastic polyester Short Term Properties Brochure, *Ticona A business of Celanese AG*, 10 pages (Copyright 2001).
International Search Report and Written Opinion mailed Dec. 26, 2011.

*Primary Examiner* — Charlie Peng
(74) *Attorney, Agent, or Firm* — Merchant & Gould P.C.

(57) ABSTRACT

A fiber optic cable assembly includes a main fiber optic cable and a pre-connectorized fiber optic cable assembly. Optical fibers of the main fiber optic cable are mass fusion spliced to optical fibers of the pre-connectorized fiber optic cable assembly thereby forming a mass fusion splice. The mass fusion splice is positioned within an outer jacket of the main fiber optic cable. A reinforcing member and a protective transition member are applied to make the fiber optic cable assembly. A method of making the fiber optic cable assembly is also disclosed.

29 Claims, 16 Drawing Sheets

U.S. PATENT DOCUMENTS

| | | |
|---|---|---|
| 7,440,667 B2 | 10/2008 | Mullaney et al. |
| 7,572,064 B2 | 8/2009 | deJong |
| 7,594,764 B2 | 9/2009 | Palmer et al. |
| 7,658,553 B2 | 2/2010 | Semmler et al. |
| 7,815,377 B2 | 10/2010 | Doss et al. |
| 7,945,136 B2 | 5/2011 | Cooke et al. |
| 8,333,519 B2 * | 12/2012 | Marcouiller et al. ........... 385/95 |
| 2003/0179980 A1 | 9/2003 | Baechtle |
| 2008/0138026 A1 | 6/2008 | Yow et al. |
| 2008/0170833 A1 * | 7/2008 | Castonguay et al. ......... 385/135 |
| 2009/0022457 A1 | 1/2009 | de Jong et al. |
| 2009/0060421 A1 | 3/2009 | Parikh et al. |
| 2010/0142905 A1 | 6/2010 | Billman et al. |
| 2010/0183265 A1 | 7/2010 | Barnes et al. |
| 2010/0303416 A1 | 12/2010 | Danley et al. |

* cited by examiner

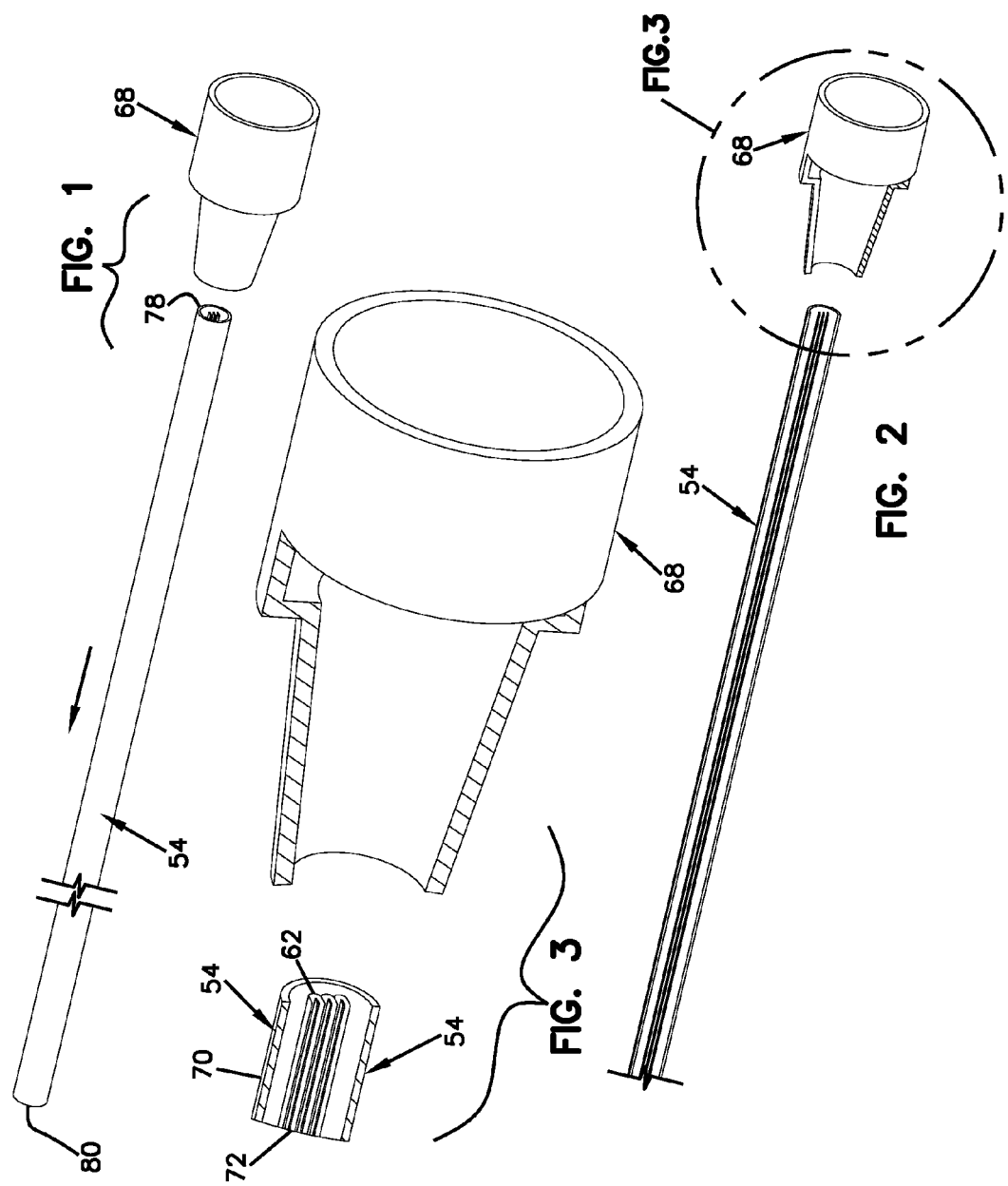

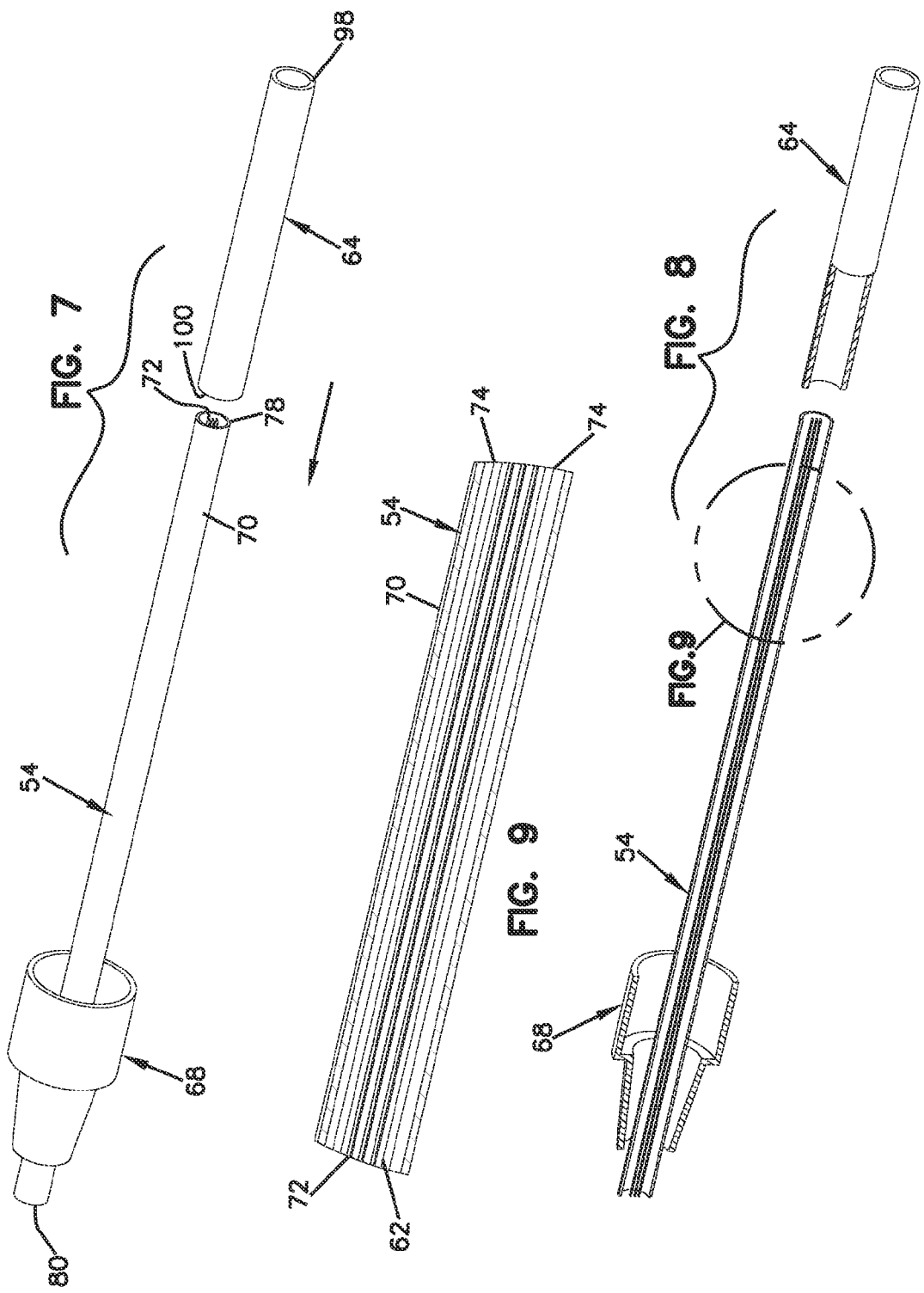

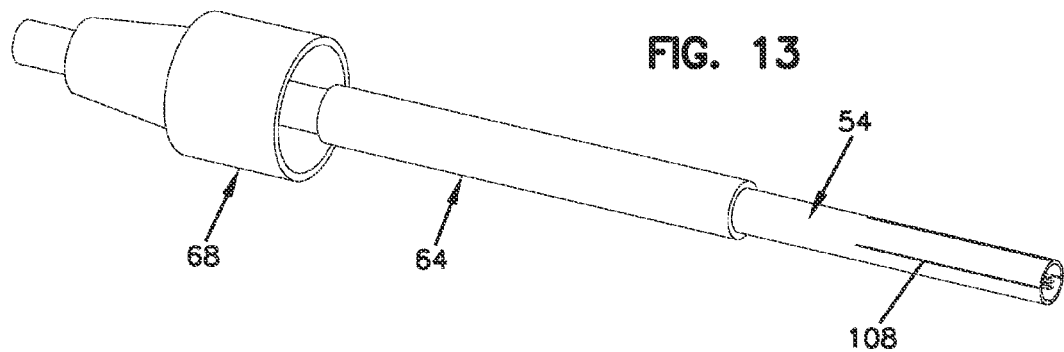
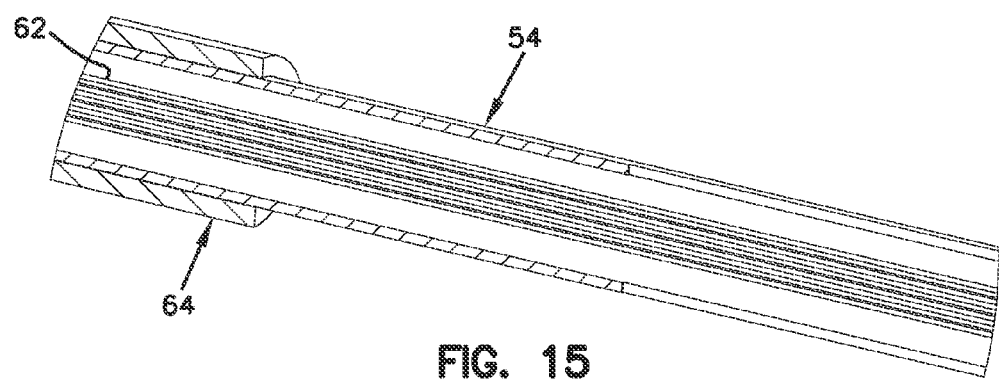
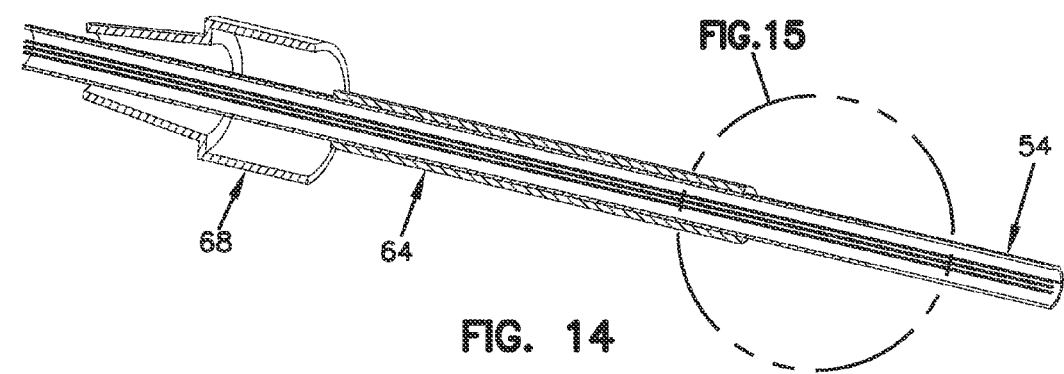

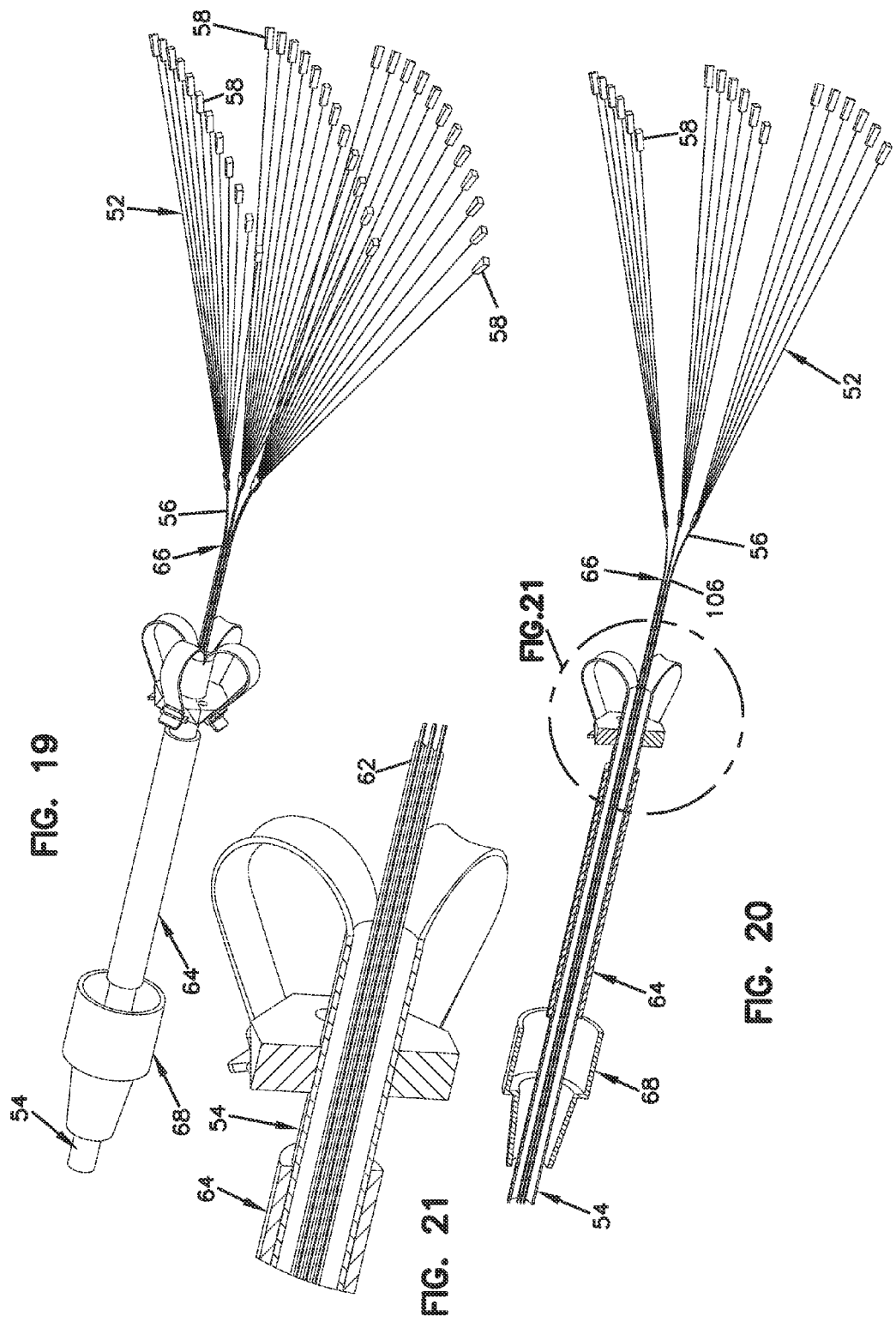

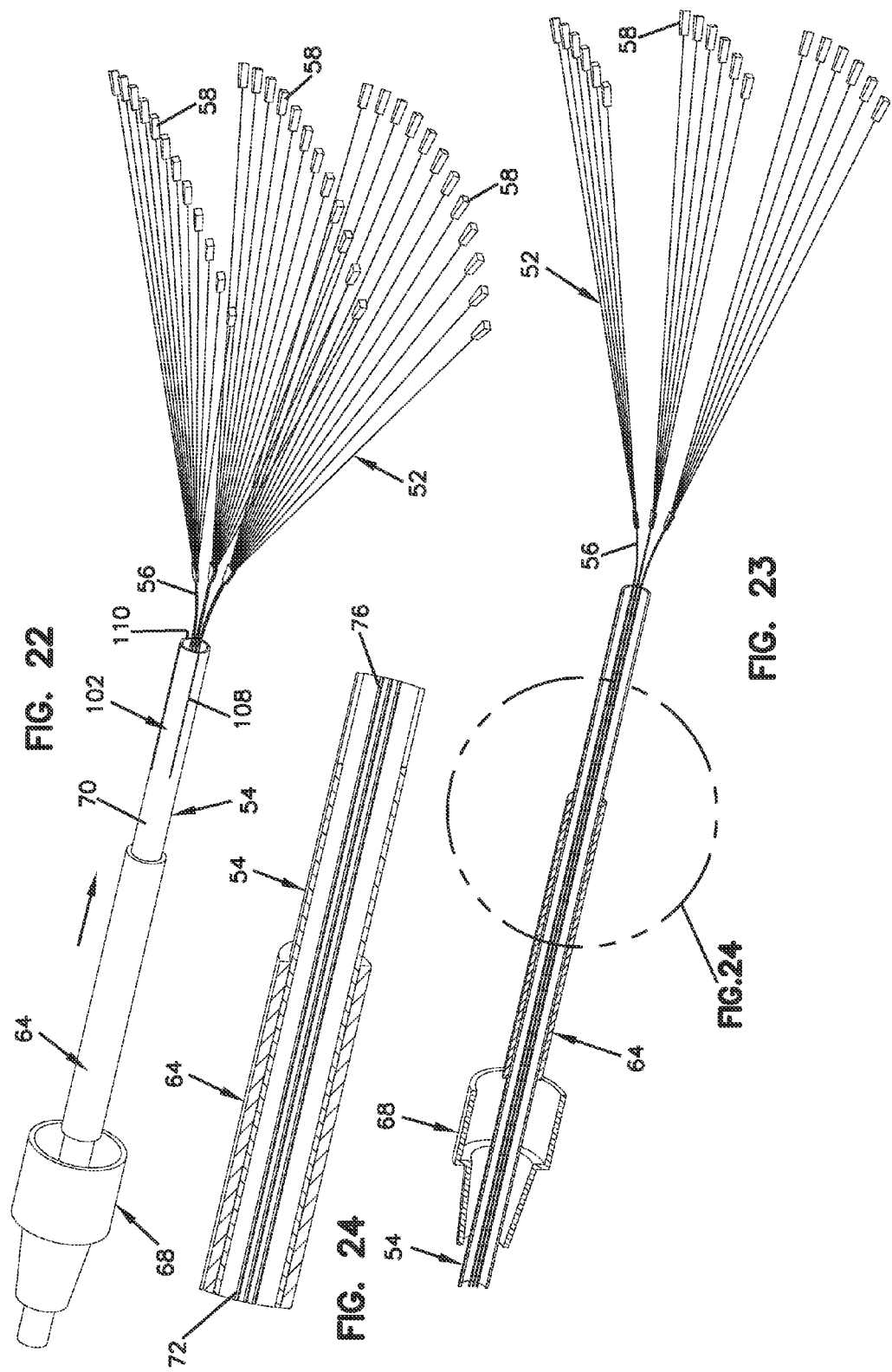

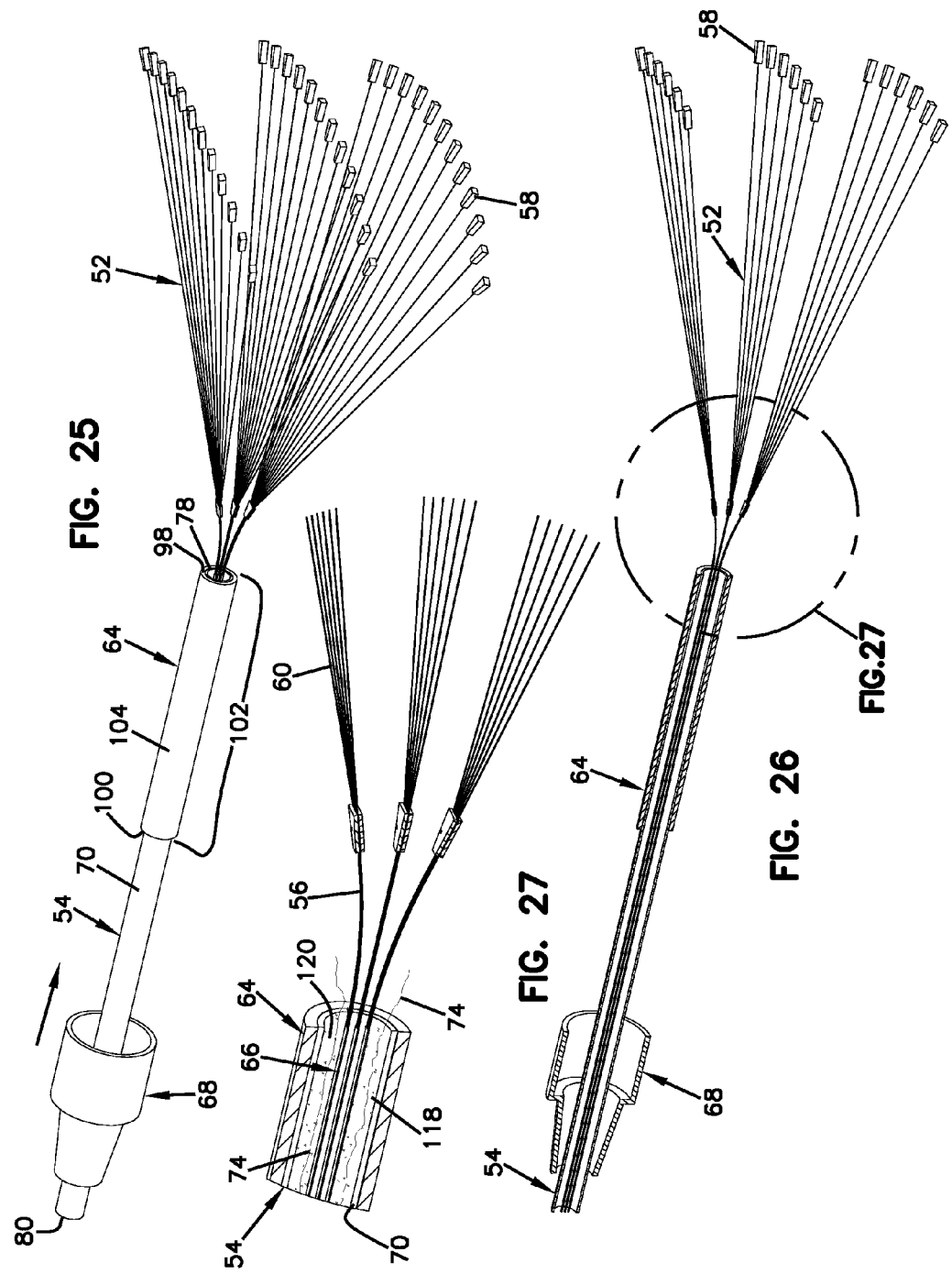

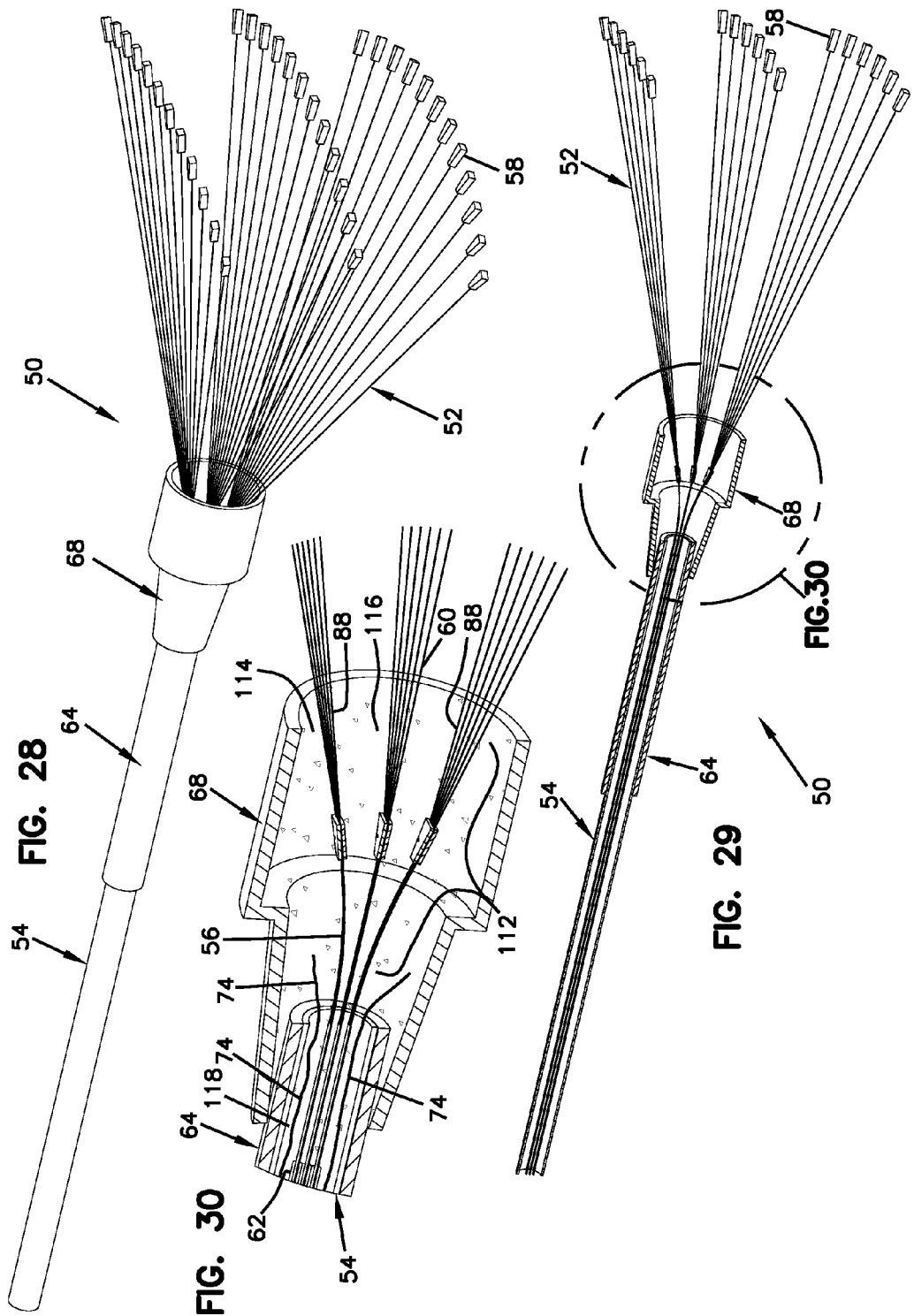

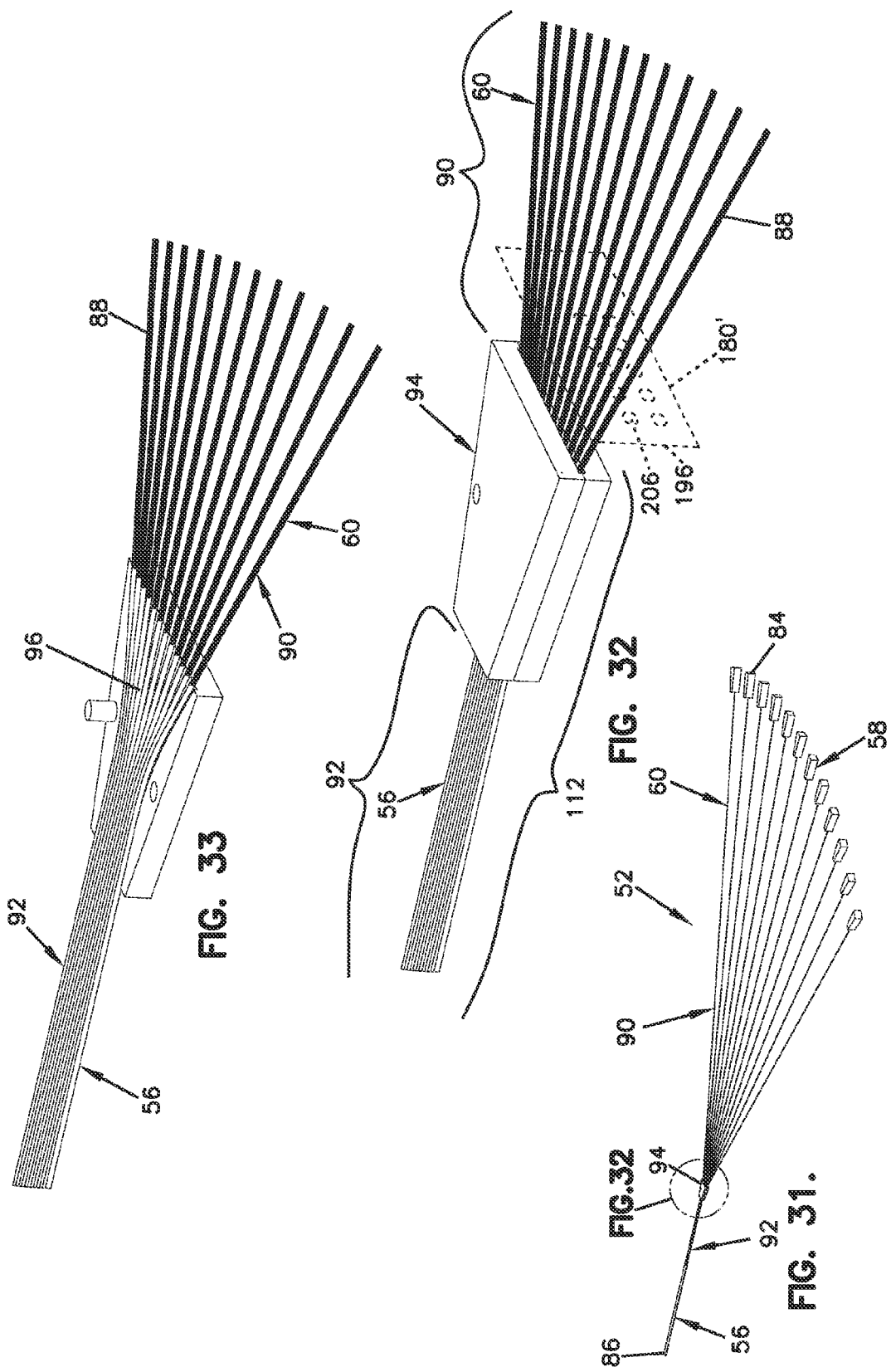

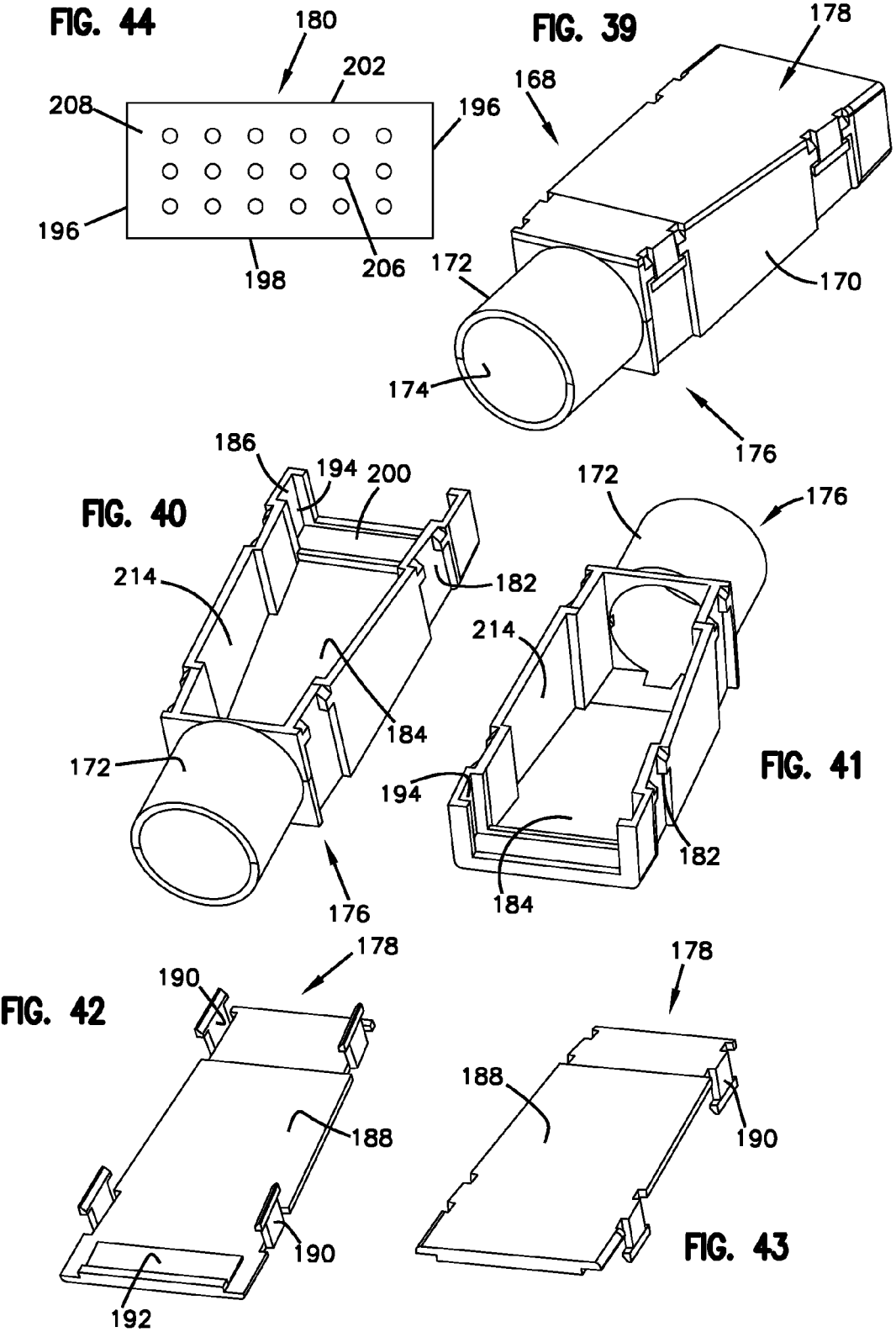

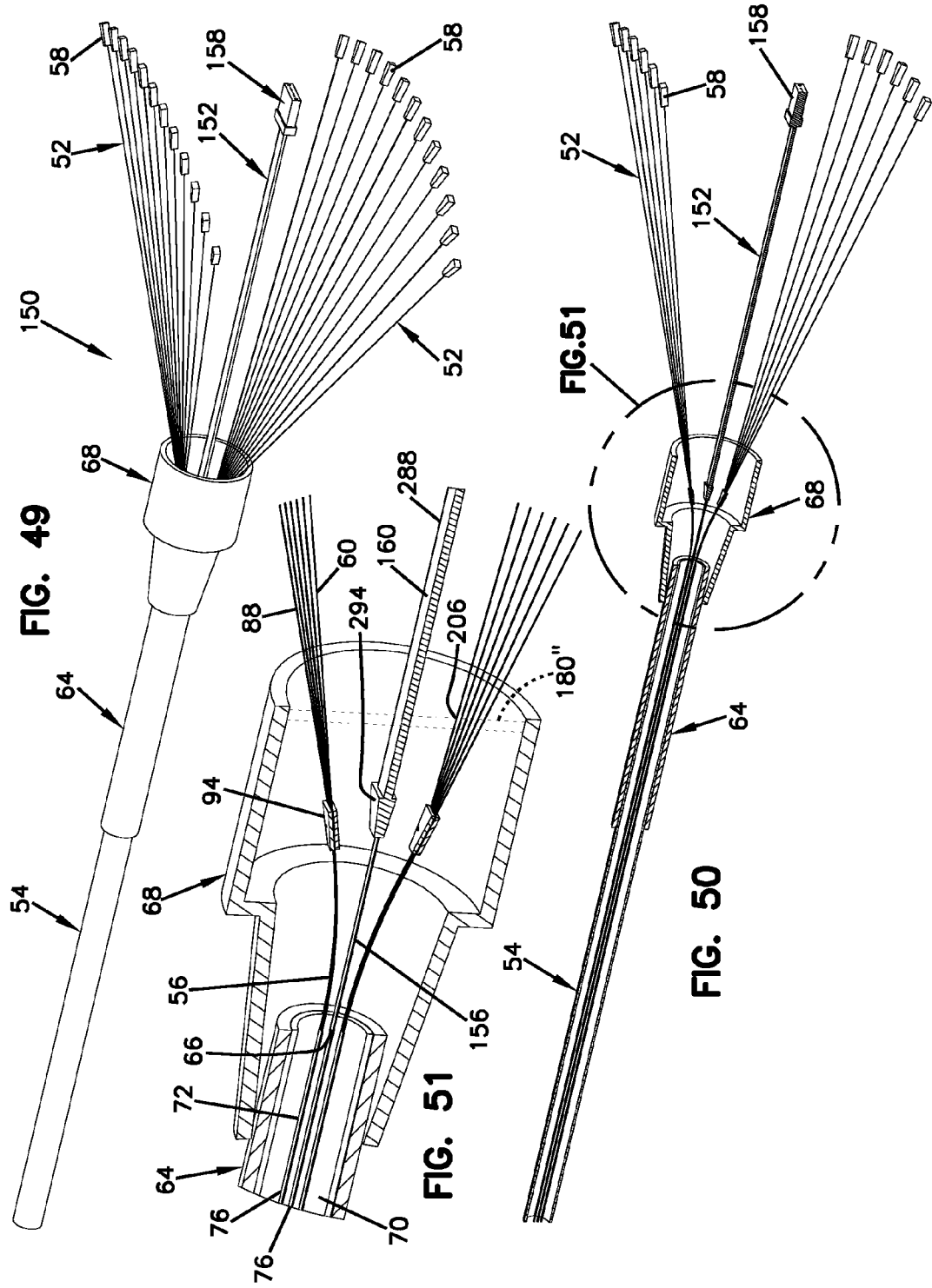

FIBER OPTIC CABLE ASSEMBLY AND METHOD OF MAKING THE SAME

CROSS-REFERENCE TO RELATED APPLICATION

This application claims the benefit of U.S. Provisional Patent Application Ser. No. 61/325,133, filed Apr. 16, 2010, which application is hereby incorporated by reference in its entirety.

TECHNICAL FIELD

The present disclosure relates to fiber optic cable assemblies, and more particularly to manufacturing connectorized fiber optic cable assemblies.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at ends of the fiber optic cables. Fiber optic connectors generally include ferrules that support ends of the optical fibers of the fiber optic cables. End faces of the ferrules are typically polished and are often angled. For certain applications, fiber optic adapters can be used to align and/or mechanically couple two fiber optic connectors together. Fiber optic connectors can include ferrules supporting single optical fibers (i.e., single-fiber ferrules corresponding to single-fiber connectors) and can also include ferrules supporting multiple optical fibers (i.e., multiple-fiber ferrules corresponding to multiple-fiber connectors).

A fiber optic cable can be connectorized by applying one or more fiber optic connectors to the fiber optic cable, thereby producing a connectorized fiber optic cable assembly. Connectorization of a fiber optic cable can be performed in the field (e.g., at an installation site of the fiber optic cable assembly) or in a factory. Factory connectorization typically offers an environment and access to production equipment best suited for high quality connectorization, and field connectorization offers the ability to customize the fiber optic cable assembly to match requirements of the installation site. Customized fiber optic cable assemblies can also be ordered for production at a factory. For example, a type of fiber optic cable, a type or types of fiber optic connectors, and a length or lengths that characterize the customized fiber optic cable assembly can be specified and ordered from the factory.

A wide variation in cable types, fiber counts, connector types, lengths to and between connectors, and applications for multi-fiber cables assemblies can be specified and ordered from the factory. The custom cable assembly order typically results in a main cable and multiple connectors being procured at the factory. When the main cable and the connectors have been received at the factory, a time-consuming "break out" process is followed to get individual fibers of the main cable ready for connectorization. The main cable and its associated packaging reel are moved through the factory for subsequent operations where the connectors are placed on the fiber ends and the cable assembly is tested. Connectorization of the fibers of the main cable can not begin until the main cable is received, cut, and prepared. In certain cases, custom cable assemblies are specified with connectorization only on one end of the main cable, making testing of the cable assembly difficult. Tubing (e.g., thin walled tubes), such as loose buffer tubes or furcation tubing, used for individual fiber protection within the main cable is sometimes broken out of the main cable to protect the individual fiber between the main cable and the connector. However, this tubing is typically lacking in robustness and mechanical strength for this application.

SUMMARY

The present disclosure relates to a fiber optic cable assembly including a main fiber optic cable, a pre-connectorized fiber optic cable assembly, a reinforcing member, a mass fusion splice, and a protective transition member.

The main fiber optic cable includes an outer jacket, a plurality of optical fibers surrounded by the outer jacket, and at least one strength member surrounded by the outer jacket. The main fiber optic cable extends from a first end to a second end. The plurality of optical fibers of the main fiber optic cable have an end positioned adjacent the first end of the main fiber optic cable. The optical fibers of the main fiber optic cable can be positioned within thin wall tubes of the main fiber optic cable. The thin wall tubes are positioned within the outer jacket of the main fiber optic cable.

The pre-connectorized fiber optic cable assembly includes a plurality of optical fibers and at least one fiber optic connector. The optical fibers of the plurality of optical fibers of the pre-connectorized fiber optic cable assembly have distal ends and proximal ends. The distal ends are terminated by the at least one fiber optic connector, and the proximal ends are adapted for mass fusion splicing. The pre-connectorized fiber optic cable assembly can include a plurality of single fiber cables. Each of the optical fibers of the pre-connectorized fiber optic cable assembly can be positioned within a single fiber jacket of one of the single fiber cables. The pre-connectorized fiber optic cable assembly can include a ribbonized portion with no single fiber jacket positioned around the optical fibers of the pre-connectorized fiber optic cable assembly and also include a jacketed portion. The pre-connectorized fiber optic cable assembly can include a strength reinforcement between the ribbonized portion and the jacketed portion. The single fiber jackets of the single fiber cables can be higher in mechanical strength than the thin wall tubes of the main fiber optic cable.

The reinforcing member extends from a first end to a second end and is positioned around a longitudinal portion of the outer jacket of the main fiber optic cable. The first end of the reinforcing member is positioned nearer to the first end of the main fiber optic cable than the second end of the reinforcing member, and the second end of the reinforcing member is positioned nearer to the second end of the main fiber optic cable than the first end of the reinforcing member. The reinforcing member can be a heat shrink tube. The heat shrink tube can be a thick-walled heat shrink tube.

The mass fusion splice optically joins the proximal ends of the optical fibers of the plurality of optical fibers of the pre-connectorized fiber optic cable assembly to the end of the plurality of optical fibers of the main fiber optic cable. The mass fusion splice can include a UV re-coating. The mass fusion splice is positioned within the reinforcing member and within the outer jacket of the main fiber optic cable. The longitudinal portion of the outer jacket of the main fiber optic cable can include at least one cut extending from an end of the outer jacket. The cut allows access to within the outer jacket for forming the mass fusion splice when the fiber optic cable assembly is being manufactured. In certain embodiments, four longitudinal cuts are used to open the end of the outer jacket. The four longitudinal cuts can be equally spaced circumferentially about the outer jacket.

The protective transition member is positioned over the first end of the main fiber optic cable and is positioned around a portion of the pre-connectorized fiber optic cable assembly. An interior of the protective transition member is at least partially filled with a first solidified filling material. The first solidified filling material can be an epoxy. The single fiber jackets of the single fiber cables can be secured to the main fiber optic cable by the first solidified filling material. Strength members of the single fiber cables can be secured to the main fiber optic cable by the first solidified filling material.

A second solidified filling material can at least partially fill an interior of the longitudinal portion of the outer jacket that is positioned within the reinforcing member. The second solidified filling material can be a polyurethane foam. The mass fusion splice can be positioned within the second solidified filling material. The at least one strength member of the main fiber optic cable can be secured to the second solidified filling material.

The optical fibers of the main fiber optic cable can be a first type of optical fiber, and at least one of the optical fibers of the pre-connectorized fiber optic cable assembly can be a second type of optical fiber. The first type of optical fiber can be lower in cost than the second type of optical fiber. The second type of optical fiber can be performance matched to the fiber optic connector terminating the second type of optical fibers.

The present disclosure also relates to a method of making the fiber optic cable assembly. The method includes selecting and providing the main fiber optic cable, selecting and providing the pre-connectorized fiber optic cable assembly, mass fusion splicing the proximal ends of the optical fibers of the pre-connectorized fiber optic cable assembly to the end of the optical fibers of the main fiber optic cable thereby forming the mass fusion splice, positioning the mass fusion splice within the outer jacket of the main fiber optic cable, applying the reinforcing member to the outer jacket of the main fiber optic cable with the reinforcing member positioned over the mass fusion splice, and applying the protective transition member to the main fiber optic cable and the pre-connectorized fiber optic cable assembly. The method can further include pre-applying the protective transition member to the main fiber optic cable and pre-applying the reinforcing member to the main fiber optic cable. The method can further include opening the end of the outer jacket of the main fiber optic cable before forming the mass fusion splice and closing the end of the outer jacket after forming the mass fusion splice. The method can further include UV recoating the mass fusion splice after forming the mass fusion splice. Selecting and providing the main fiber optic cable can be done independently of selecting and providing the pre-connectorized fiber optic cable assembly.

BRIEF DESCRIPTION OF THE DRAWINGS

FIG. 1 is a perspective view of a main fiber optic cable and a protective transition member in position to be pre-applied on the main fiber optic cable;

FIG. 2 is a cross-sectional cut-away view of FIG. 1;

FIG. 3 is an enlarged detail view of FIG. 2;

FIG. 7 is a perspective view of the pre-applied protective transition member and the main fiber optic cable of FIG. 4 with a reinforcing member in position to be pre-applied on the main fiber optic cable;

FIG. 8 is a cross-sectional cut-away view of FIG. 7;

FIG. 9 is an enlarged detail view of FIG. 8;

FIG. 13 is a perspective view of the main fiber optic cable of FIG. 10 including longitudinal cuts that form strips at an end of a jacket of the main fiber optic cable;

FIG. 14 is a cross-sectional cut-away view of FIG. 13;

FIG. 15 is an enlarged detail view of FIG. 14;

FIG. 19 is a perspective view of the main fiber optic cable of FIG. 16 with a pre-connectorized fiber optic cable assembly optically connected to optical fibers of the main fiber optic cable at a splice;

FIG. 20 is a cross-sectional cut-away view of FIG. 19;

FIG. 21 is an enlarged detail view of FIG. 20;

FIG. 22 is a perspective view of the main fiber optic cable and the pre-connectorized fiber optic cable assembly of FIG. 19 with the fixture of FIG. 16 removed and the strips at the end of the jacket of FIG. 13 closed over the splice of FIG. 19;

FIG. 23 is a cross-sectional cut-away view of FIG. 22;

FIG. 24 is an enlarged detail view of FIG. 23;

FIG. 25 is a perspective view of the main fiber optic cable and the pre-connectorized fiber optic cable assembly of FIG. 22 with the reinforcing member of FIG. 7 applied over the strips at the end of the jacket of FIG. 13 and the splice of FIG. 19;

FIG. 26 is a cross-sectional cut-away view of FIG. 25;

FIG. 27 is an enlarged detail view of FIG. 26;

FIG. 28 is a perspective view of the main fiber optic cable and the pre-connectorized fiber optic cable assembly of FIG. 25 with the protective transition member of FIG. 1 applied thereby forming a fiber optic cable assembly;

FIG. 29 is a cross-sectional cut-away view of FIG. 28;

FIG. 30 is an enlarged detail view of FIG. 29;

FIG. 31 is a perspective view of the pre-connectorized fiber optic cable assembly of FIG. 19;

FIG. 32 is an enlarged detail view of FIG. 31 illustrating a ribbonized portion and a jacketed portion with a strength reinforcement between the ribbonized portion and the jacketed portion;

FIG. 33 is the enlarged detail view of FIG. 32 but with a top half of the strength reinforcement removed;

FIG. 39 is a perspective view of another protective transition member adapted for another fiber optic cable assembly similar to the fiber optic cable assembly of FIG. 28;

FIG. 40 is a perspective view of a base of the protective transition member of FIG. 39;

FIG. 41 is another perspective view of the base of FIG. 40;

FIG. 42 is a perspective view of a cover of the protective transition member of FIG. 39;

FIG. 43 is another perspective view of the cover of FIG. 42;

FIG. 44 is a front elevation view of a cable support member of the protective transition member of FIG. 39;

FIG. 49 is a perspective view of another fiber optic cable assembly similar to the fiber optic cable assembly of FIG. 28 but including a pre-connectorized fiber optic cable assembly with a multi-fiber connector;

FIG. 50 is a cross-sectional cut-away view of FIG. 49; and

FIG. 51 is an enlarged detail view of FIG. 50.

DETAILED DESCRIPTION

Figure 4:
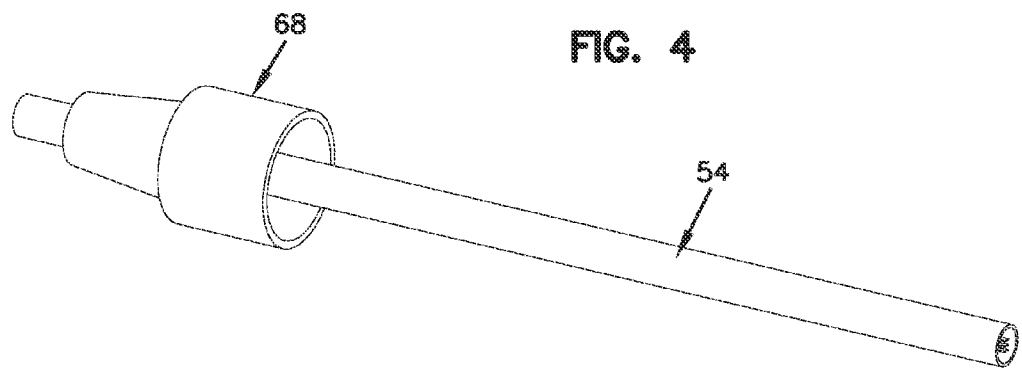
FIG. 4 is a perspective view of the protective transition member of FIG. 1 pre-applied on the main fiber optic cable of FIG. 1.

The present disclosure relates to fiber optic cable assemblies and methods of making them. A goal of the present disclosure is to increase efficiency in manufacturing fiber optic cable assemblies. In view of this goal, pre-connectorized fiber optic cable assemblies are optically and mechanically joined to multi-fiber fiber optic cables. Examples of pre-connectorized fiber optic cable assemblies 52, 152 are illustrated at FIGS. 31, 32, and 50, and an example of a multi-fiber fiber optic cable 54 (i.e., a main fiber optic cable) is illustrated at FIGS. 1-3. One or more of the pre-connectorized fiber optic cable assemblies 52, 152 are joined to the main fiber optic cable 54 to form a fiber optic cable assembly 50, 150, illustrated at FIGS. 28-30 and 49-51. A number of advantages can be achieved when using the methods describe herein. They include:

1) Connectorization of the pre-connectorized fiber optic cable assembly 52, 152 can be done independent of the main fiber optic cable 54. This avoids having an often large and difficult to handle spool of the main fiber optic cable 54 present when the connectorization is performed. This allows making the pre-connectorized fiber optic cable assemblies 52, 152 on higher speed equipment and/or making to stock. This also saves total manufacturing labor compared to breaking out long lengths of optical fiber.

2) Optical performance of the optical joint can be very good, particularly when using mass fusion splicing. Optical performance of the fiber optic cable assembly 50, 150 can also be enhanced by selecting optical fibers 56, 156 (see FIGS. 31-33 and 51) for the pre-connectorized fiber optic cable assembly 52, 152 that have optimal performance when matched with fiber optic connectors 58, 158 that are specified.

3) The fiber optic cable assembly 50, 150 can be made to a particular design using the same manufacturing process with the main fiber optic cable 54 being supplied by any of a number of different manufacturers and varying in specification.

4) The fiber optic cable assembly 50, 150 can be made to a particular design using the same manufacturing process with optical fiber 72 of the main fiber optic cable 54 supplied by any of a number of different manufacturers and varying in specification.

5) Fiber optic cables 60, 160 of the pre-connectorized fiber optic cable assembly 52, 152 can have specifications separate from thin walled tubes 62 (e.g., buffer tubes) included within certain fiber optic cables (e.g., the main fiber optic cable 54).

In addition to the main fiber optic cable 54 and one or more of the pre-connectorized fiber optic cable assemblies 52, 152, the example fiber optic cable assembly 50, 150 can include a reinforcing member 64, a mass fusion splice 66, and a protective transition member 68, 168 (see FIGS. 19-21, 28-30, and 39).

The example main fiber optic cable 54 includes an outer jacket 70, a plurality of optical fibers 72 surrounded by the outer jacket 70, and one or more strength members 74 surrounded by the outer jacket 70 (see FIG. 9). In certain embodiments, some or all of the optical fibers 72 can be combined as ribbonized fibers (i.e., a fiber ribbon) 76 (see FIG. 24). In the illustrated example main fiber optic cable 54, the optical fibers 72 are arranged into three of the fiber ribbons 76. In certain embodiments, the main fiber optic cable 54 can include the tubes 62 (e.g., loose buffer tubes), mentioned above (see FIG. 21). Each of the fiber ribbons 76 can be positioned within one of the tubes 62. The main fiber optic cable 54 extends from a first end 78 to a second end 80 (see FIG. 1). The cable 54 can be provided in varying lengths. To accommodate lengthy embodiments of the main fiber optic cable 54 and lengthy embodiments of the fiber optic cable assembly 50, 150, the main fiber optic cable 54 can be rolled up, wound about a storage spool, etc. The optical fibers 72 of the main fiber optic cable 54 have ends 82 positioned adjacent the first end 78 of the main fiber optic cable 54 (see FIG. 5). The ends 82 of the optical fibers 72 can be spaced from the first end 78 of the main fiber optic cable 54. The ends 82 of the optical fibers 72 can be positioned within the outer jacket 70 of the main fiber optic cable 54. The optical fibers 72 of the main fiber optic cable 54 can be positioned within the tubes 62 of the main fiber optic cable 54. The tubes 62 can thereby enclose one or more of the optical fibers 72 (see FIG. 3). The tubes 62 are positioned within the outer jacket 70 of the main fiber optic cable 54.

A typical example of the tube 62 has an outer diameter of 3 mm and a wall thickness of 0.5 mm. The typical thin wall tube 62 can be broken out of the outer jacket 70 of the main fiber optic cable 54 or extend beyond the ends 78, 80 of the main fiber optic cable 54. When extending externally from the outer jacket 70, the thin wall tube 62 can be routed to various optical components separate from the main fiber optic cable 54. However, the typical thin wall tube 62 can be relatively stiff, hard, and/or inflexible. Thus, the thin wall tube 62 may not be ideal for routing the optical fibers 72, within the thin wall tube 62, to and/or through the various optical components. In general, the thin wall tubes 62 can have characteristics specified that are beneficial to their application within the main fiber optic cable 54. These characteristics can include cost, manufacturing characteristics (e.g., extrudability), stiffness, strength, environmental durability, frictional characteristics, heat resistance, fire resistance, etc. The characteristics that are beneficial to the application of the tubes 62 within the main fiber optic cable 54 are not always beneficial for application of the tube 62 external from the main fiber optic cable 54. In general, the tube 62 can be any tube, sheathing, conduit, etc., used within the main fiber optic cable 54, that is positioned around one or more of the optical fibers 72.

The example pre-connectorized fiber optic cable assemblies 52, 152 include a plurality of the optical fibers 56, 156 and one or more of the fiber optic connectors 58, 158 (see FIGS. 31 and 50). The fiber optic connectors 58, 158 can include, in any combination and quantity, an LC connector, an SC connector, an MT connector, an LX connector, and other types of single fiber and/or multi-fiber fiber optic connectors. As illustrated at the figures, the fiber optic connector 58 depicts a single-fiber fiber optic connector and the fiber optic connector 158 depicts a multi-fiber fiber optic connector. The optical fibers 56, 156 of the pre-connectorized fiber optic cable assembly 52, 152 have distal ends 84 and proximal ends 86 (see FIG. 31). The optical fibers 56, 156 and/or the fiber optic cables 60, 160 of the pre-connectorized fiber optic cable assembly 52, 152 can included characteristics specified for a given application (e.g., routing to and/or through the various optical components). The characteristics of a fiber jacket 88, 288 of the fiber optic cable 60, 160 can be specified separately from the characteristics of the tube 62 of the main fiber optic cable 54. The characteristics of the optical fibers 56, 156 within the fiber optic cable 60, 160 can be specified separately from the characteristics of the optical fibers 72 of the main fiber optic cable 54. The characteristics of the fiber optic cable 60, 160 can be specified separately from characteristics of the tube 62 and its contents. For example, the optical fibers 56 and the fiber optic cables 60 can be flexible and adapted to route to and/or through the various optical components. The fiber optic cable 60, 160 can be specified for strength requirements of a given application. The fiber optic cable 60, 160 can include one or more strength member 96. The fiber jacket 88, 288 of the fiber optic cable 60, 160 can be a reinforced fiber jacket. The fiber jacket 88, 288 can enclose one or more of the optical fibers 56, 156.

The distal ends 84 of the optical fibers 56, 156 of the pre-connectorized fiber optic cable assembly 52, 152 are terminated by the fiber optic connectors 58, 158, and the proximal ends 86 are adapted for mass fusion splicing. More than one distal end 84 can be terminated by the multi-fiber fiber optic connector 158 (e.g., the MT connector). The fiber optic cables 60, 160 can be single fiber cables or multi-fiber cables. As illustrated at the figures, the fiber optic cable 60 depicts a single-fiber cable, and the fiber optic cable 160 depicts a multi-fiber cable. The pre-connectorized fiber optic cable assembly 52, 152 can include a plurality of the single fiber cables 60 and/or the multi-fiber cables 160. The fiber jacket 88, 288 can be a single fiber jacket or a multi-fiber jacket. As illustrated at the figures, the fiber jacket 88 depicts a single-fiber jacket, and the fiber jacket 288 depicts a multi-fiber jacket. Each of the optical fibers 56 of the pre-connectorized fiber optic cable assembly 52 can be positioned within the single-fiber jacket 88 of one of the single fiber cables 60. The optical fibers 156 of the pre-connectorized fiber optic cable assembly 152 can be collectively positioned within the multi-fiber jacket 288 of the fiber optic cable 160. The pre-connectorized fiber optic cable assembly 52, 152 can include a ribbonized portion 92 with no fiber jacket 88, 288 positioned around the optical fibers 56, 156 and also include a jacketed portion 90 (see FIG. 32). The pre-connectorized fiber optic cable assembly 52, 152 can include a strength reinforcement (e.g., a fanout) 94, 294 between the ribbonized portion 92 and the jacketed portion 90 (see FIGS. 32 and 51). The jackets 88, 288 of the cables 60, 160 can be higher in mechanical strength and/or more robust than the tubes 62 of the main fiber optic cable 54. The cable 60, 160 can include one or more of the strength members 96 (see FIG. 33). The strength members 96 and/or the jacket 88, 288 of the cable 60, 160 can be anchored to and/or within the strength reinforcement 94, 294 of the pre-connectorized fiber optic cable assembly 52, 152.

The reinforcing member 64 extends from a first end 98 to a second end 100 (see FIG. 7) and is positioned around a longitudinal portion 102 of the outer jacket 70 of the main fiber optic cable 54 when assembled (see FIG. 25). The first end 98 of the reinforcing member 64 is positioned nearer to the first end 78 of the main fiber optic cable 54 than the second end 100, and the second end 100 is positioned nearer to the second end 80 of the main fiber optic cable 54 than the first end 98. The first end 98 of the reinforcing member 64 can be positioned at the first end 78 of the main fiber optic cable 54. The reinforcing member 64 can include a heat shrink tube 104 (see FIG. 25). The heat shrink tube 104 can be a thick-walled heat shrink tube.

The mass fusion splice 66 optically joins the proximal ends 86 of the optical fibers 56, 156 of the pre-connectorized fiber optic cable assembly 52, 152 to the end 82 of the optical fibers 72 of the main fiber optic cable 54 (see FIGS. 20 and 51). A mechanical splice or another type of splice could be used in place of the mass fusion splice 66. The mass fusion splice 66 can include a UV re-coating 106 (see FIG. 20). The mass fusion splice 66 can be positioned within the reinforcing member 64 and within the outer jacket 70 of the main fiber optic cable 54 (see FIGS. 27 and 51). An example of mass fusion splicing is given at U.S. Pat. No. 5,588,082, issued Dec. 24, 1996 to Whitesmith, and is hereby incorporated by reference in its entirety. Other mass fusion splicing techniques are also known in the art. Certain mass fusion splicing techniques include firing a preparation arc across ends of optical fibers for the purpose of cleaning the ends. Certain mass fusion splicing techniques include simultaneously firing a fusion arc and moving together the ends of the optical fibers being spliced. Typical mass fusion splices individually join the ends of corresponding optical fibers. When mass fusion splicing a multi-fiber ribbon to individual fibers, a separate optical splice is typically formed between each of the corresponding individual fiber ends. When mass fusion splicing a first multi-fiber ribbon to a second multi-fiber ribbon, a separate optical splice is typically formed between each of the corresponding individual fiber ends. The optical splices can be generally cylindrical in shape and match a diameter of the corresponding optical fibers.

The longitudinal portion 102 of the outer jacket 70 of the main fiber optic cable 54 can include at least one cut 108 extending from an end 110 of the outer jacket 70 (see FIG. 22). The cut 108 or cuts 108 allows access to within the outer jacket 70 for forming the mass fusion splice 66 when the fiber optic cable assembly 50, 150 is being manufactured. In the depicted embodiment, four longitudinal cuts 108 are used to open the end 110 of the outer jacket 70. The four longitudinal cuts 108 can be equally spaced circumferentially about the outer jacket 70, as shown.

Figure 10:
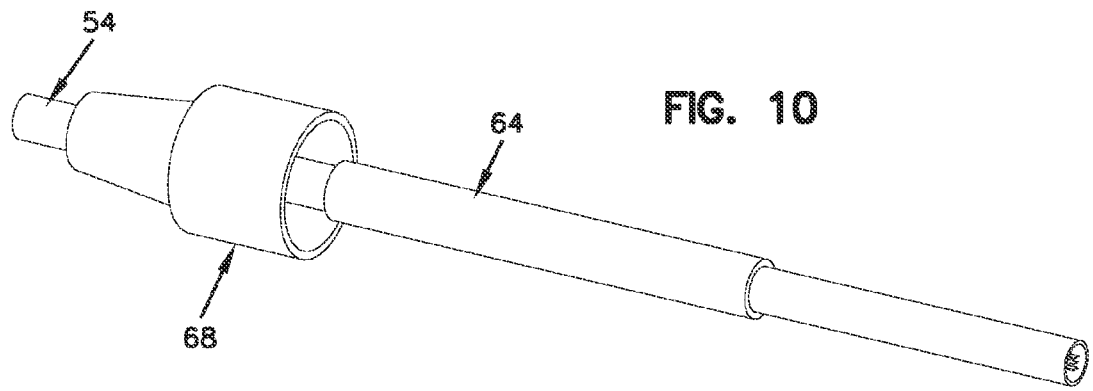
FIG. 10 is a perspective view of the reinforcing member of FIG. 7 pre-applied on the main fiber optic cable of FIG. 4.
Figure 12:
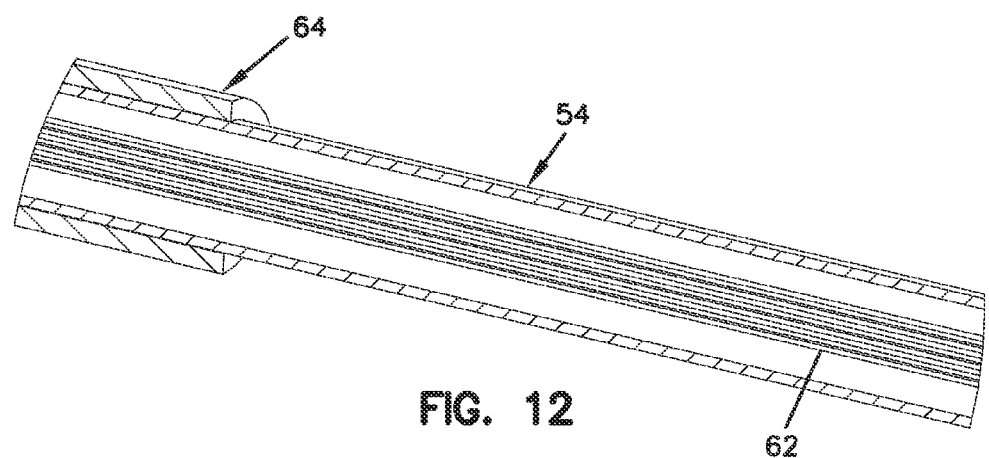
FIG. 12 is an enlarged detail view of FIG. 11.
Figure 11:
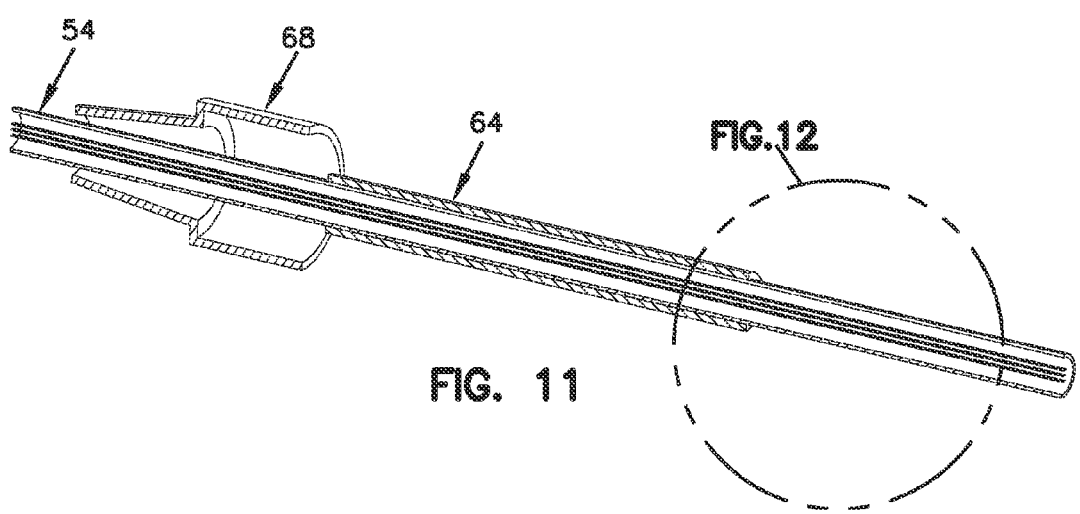
FIG. 11 is a cross-sectional cut-away view of FIG. 10.
Figure 16:
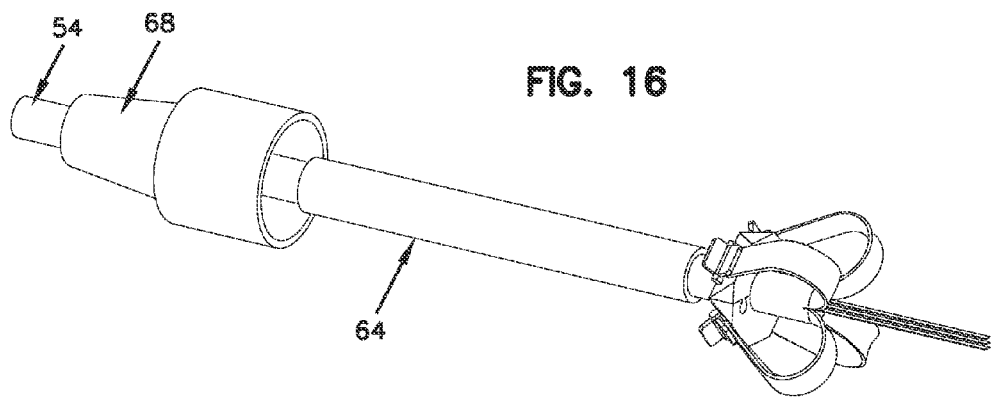
FIG. 16 is a perspective view of the main fiber optic cable of FIG. 13 with the strips of the jacket held by a fixture thereby opening the end of the jacket of the main fiber optic cable.
Figure 18:
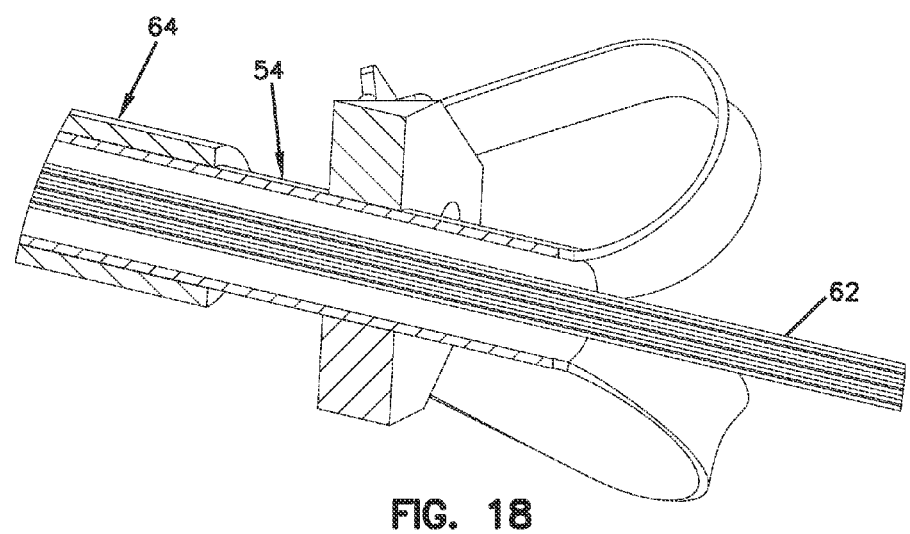
FIG. 18 is an enlarged detail view of FIG. 17.
Figure 17:
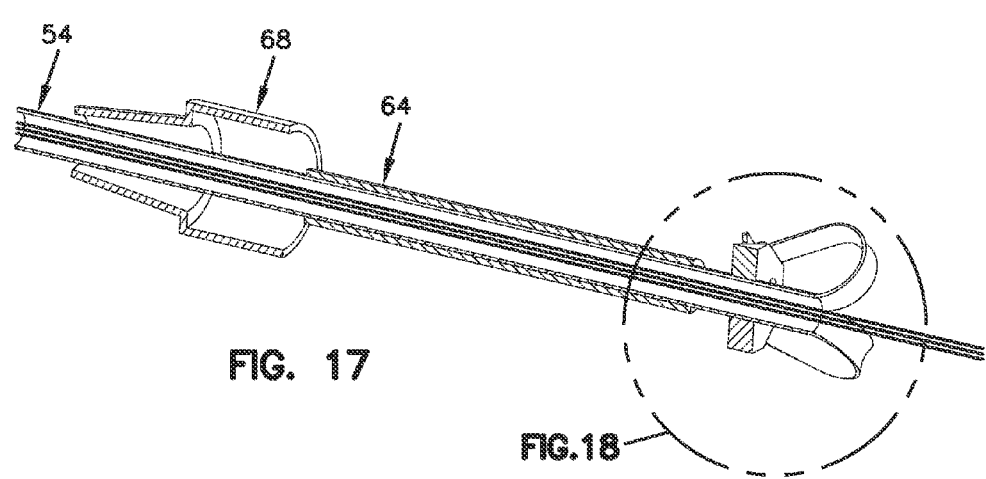
FIG. 17 is a cross-sectional cut-away view of FIG. 16.
Figure 34:
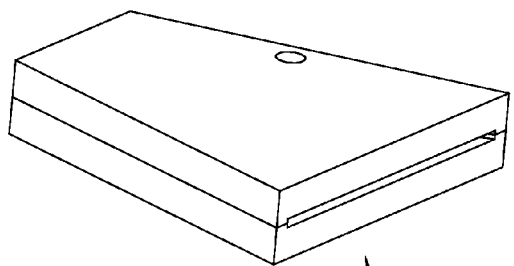
FIG. 34 is a perspective view of the strength reinforcement of FIG. 32.
Figure 35:
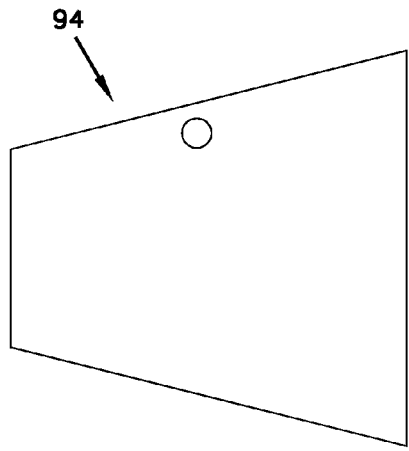
FIG. 35 is a top plan view of the strength reinforcement of FIG. 32.
Figure 36:
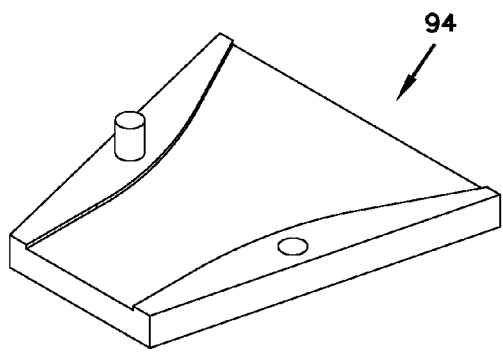
FIG. 36 is a perspective view of a bottom half of the strength reinforcement of FIG. 32.
Figure 37:
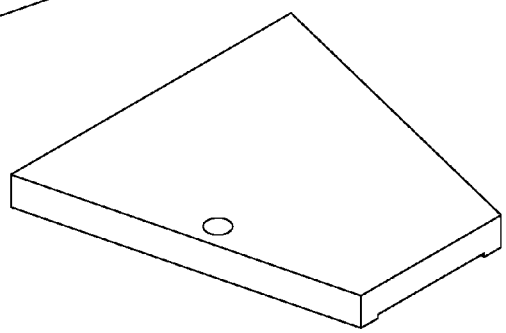
FIG. 37 is a perspective view of the top half of the strength reinforcement of FIG. 32.
Figure 38:
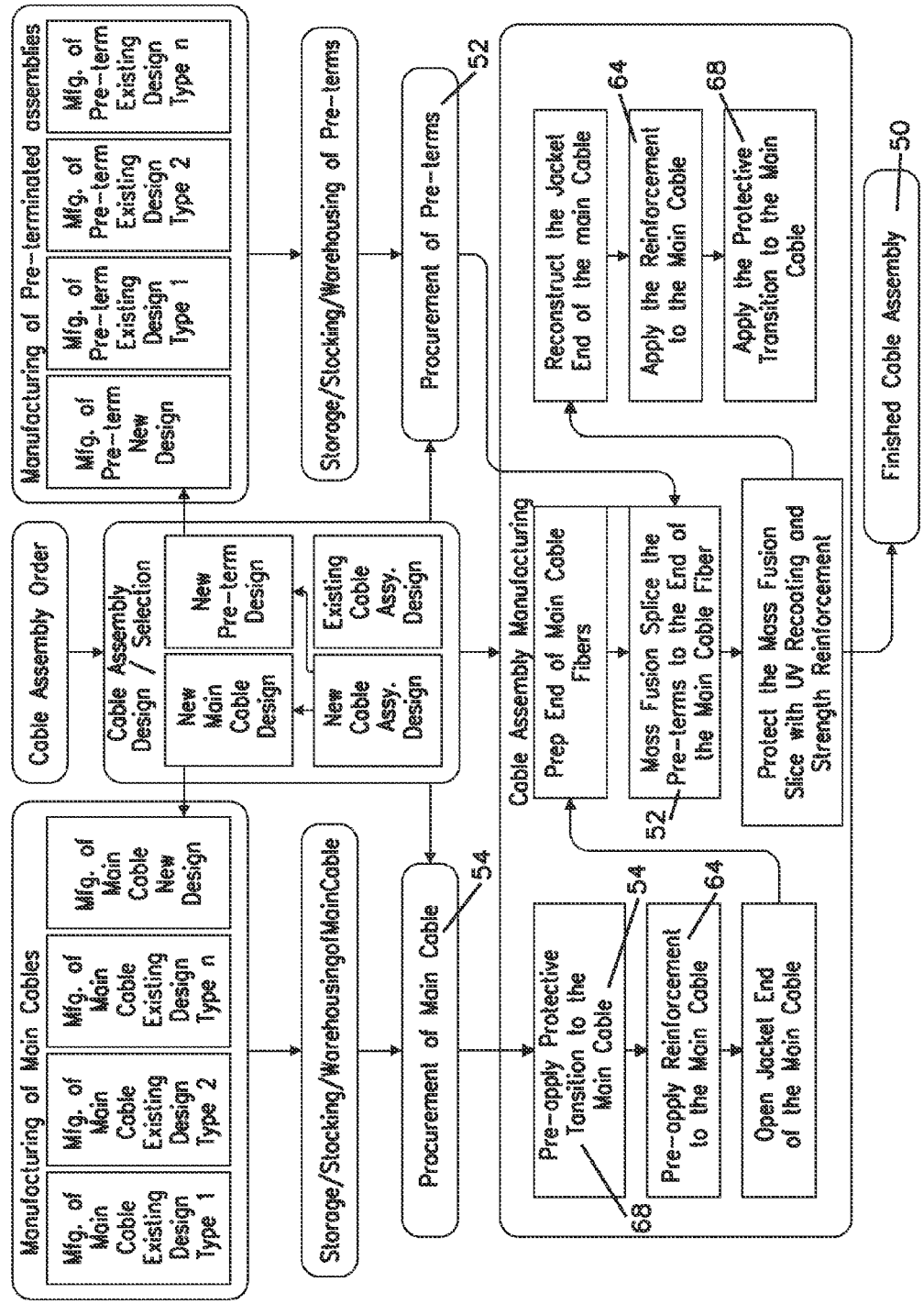
FIG. 38 is a flowchart of a method of making the fiber optic cable assembly of FIG. 28.
Figure 45:
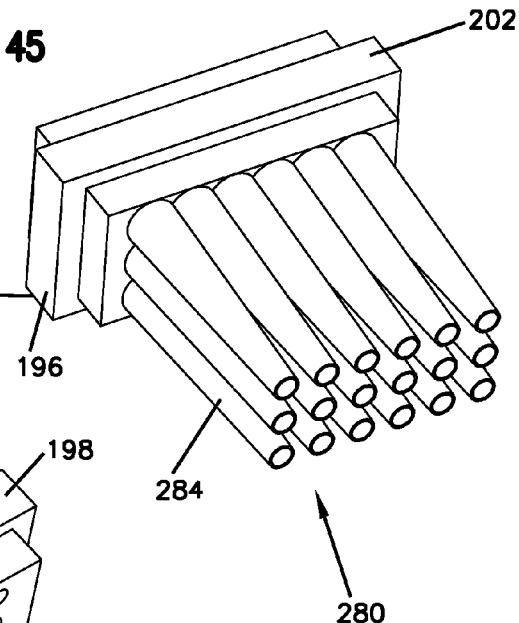
FIG. 45 is an isometric view of another cable support member of the protective transition member of FIG. 39.
Figure 46:
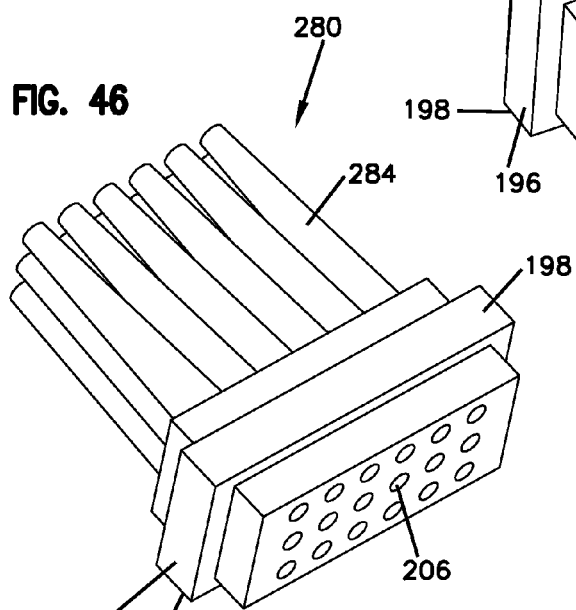
FIG. 46 is another perspective view of the cable support member of FIG. 45.
Figure 47:
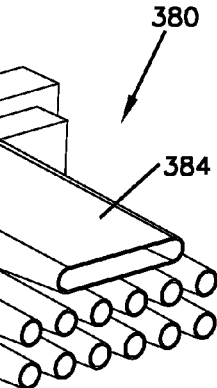
FIG. 47 is an isometric view of still another cable support member of the protective transition member of FIG. 39.
Figure 48:
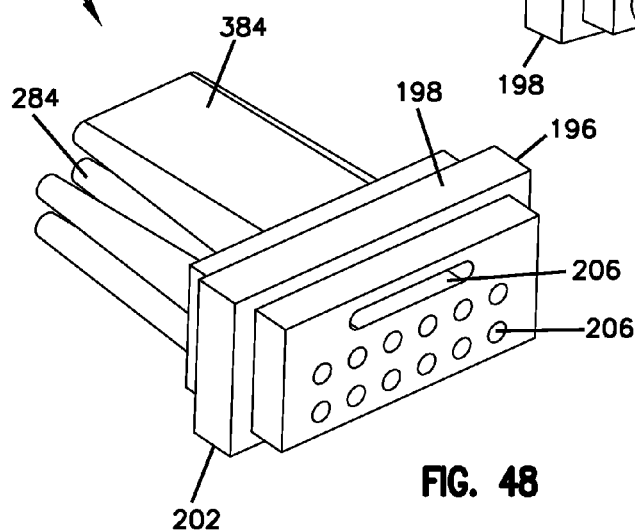
FIG. 48 is another perspective view of the cable support member of FIG. 47.

The reinforcing member 64 can be pre-positioned over the main fiber optic cable 54, as illustrated at FIGS. 10-12. The reinforcing member 64 can be pre-positioned before the longitudinal cuts 108 are made on the outer jacket 70. After the splice 66 is made between the ends 86 of the optical fibers 56, 156 and the ends 82 of the optical fibers 72, the reinforcing member 64 can be positioned over the longitudinal cuts 108. A length of the reinforcing member 64 is preferably as long as or longer than a length of the longitudinal cuts 108. The reinforcing member 64 generally coincides with (i.e., is generally coextensive with) the longitudinal cuts 108 when the fiber optic cable assembly 50, 150 is finished. The reinforcing member 64 closes or helps to close the longitudinal portion 102 of the outer jacket 70 of the main fiber optic cable 54.

Figure 6:
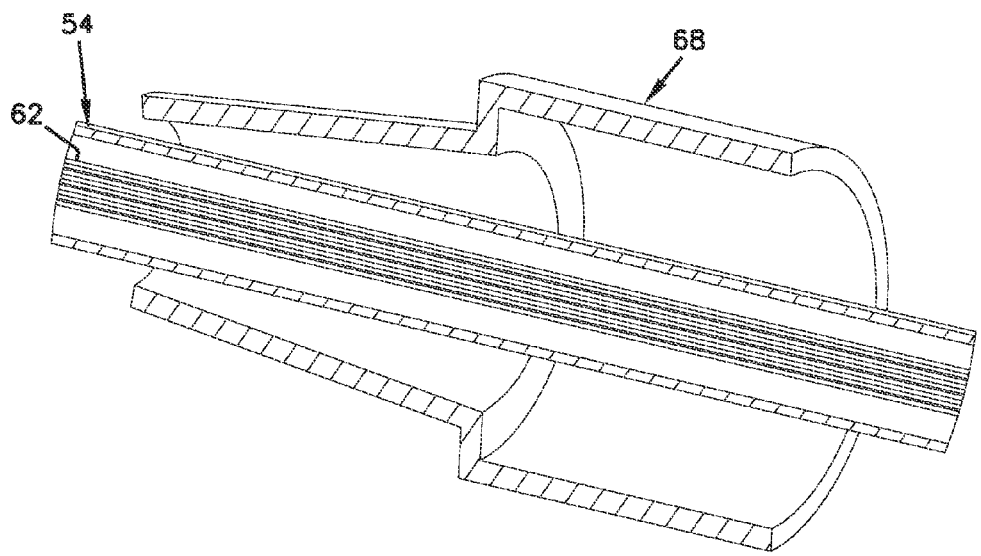
FIG. 6 is an enlarged detail view of FIG. 5.
Figure 5:
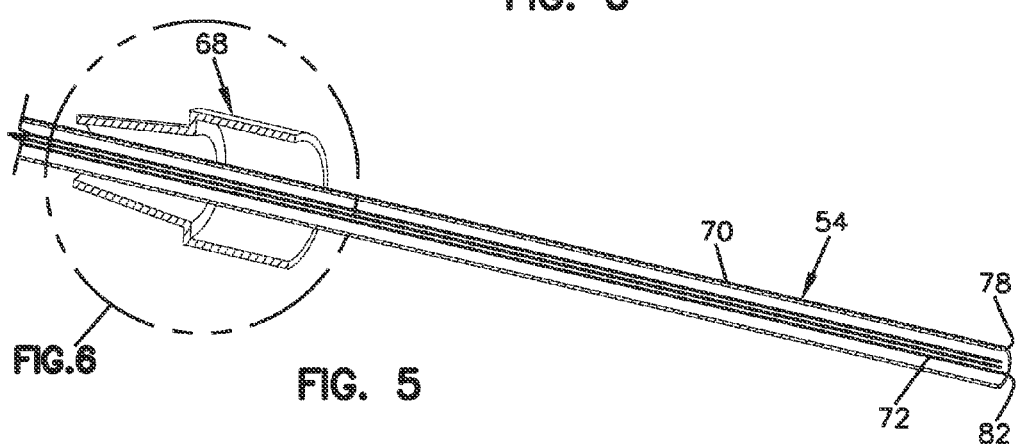
FIG. 5 is a cross-sectional cut-away view of FIG. 4.

The protective transition member 68 can be pre-positioned over the main fiber optic cable 54, as illustrated at FIGS. 4-6. The protective transition member 68 can be pre-positioned before the longitudinal cuts 108 are made on the outer jacket 70. After the splice 66 is made between the ends 86 of the optical fibers 56, 156 and the ends 82 of the optical fibers 72 and after the reinforcing member 64 is positioned over the longitudinal cuts 108, the protective transition member 68 can be positioned over the first end 78 of the main fiber optic cable 54 (see FIG. 25-27 compared with FIGS. 28-30). The illustrated protective transition member 68 is an example protective transition member and includes a tapered boot portion and a cylindrical portion. Other example protective transition members 68 can include features that individually conform to the jackets 88, 288 of one or more of the cables 60. In general, the protective transition member 68 can include special molded shapes adapted for various applications. The protective transition member 68 can be made of a rubber or rubber-like material, a relatively soft material, or a relatively hard material. The protective transition member 68 can provide strain-relief to one or more of the cables 60. The strength reinforcements 94 can be housed within the protective transition member 68. As illustrated, the strength reinforcements 94 are housed within the cylindrical portion of the protective transition member 68. As illustrated, the tapered boot portion tapers inwardly to match an outside diameter of the reinforcing member 64.

The protective transition member 68 is positioned over the first end 78 of the main fiber optic cable 54 and is positioned around a portion 112 of the pre-connectorized fiber optic cable assembly 52 (see FIGS. 30 and 32). An interior 114 of the protective transition member 68 is at least partially filled with a solidified filling material 116 (see FIG. 30). The solidified filling material 116 can be an epoxy. The single-fiber jackets 88 of the single fiber cables 60 can be secured to the main fiber optic cable 54 by the solidified filling material 116. The strength members 96 of the single-fiber cables 60 can be secured to the main fiber optic cable 54 by the solidified filling material 116. The multi-fiber jacket 288 of the multi-fiber cables 160 can be secured to the main fiber optic cable 54 by the solidified filling material 116. The strength members 96 of the multi-fiber cable 160 can be secured to the main fiber optic cable 54 by the solidified filling material 116. The strength members 96 can be directly secured to the solidified filling material 116. The strength members 96 can be indirectly secured to the solidified filling material 116 (e.g., via the strength reinforcement 94, 294). The strength members 74 of the main fiber optic cable 54 can be secured by the solidified filling material 116.

A solidified filling material 118 can at least partially fill an interior 120 of the longitudinal portion 102 of the outer jacket 70 that is positioned within the reinforcing member 64 (see FIG. 27). The solidified filling material 118 can be polyurethane foam. Before injecting the filling material 118 into the interior 120, various tubes, water swellable yarns, and central member coatings are preferably locally removed to provide clearance for better flow of the filling material 118. The better flow allows the filling material 118 to flow around the exposed coated fibers 72 and the strength members 74 without voids in the filling material 118. The mass fusion splice 66 can be positioned within the solidified filling material 118. The strength members 74 of the main fiber optic cable 54 can be secured by the solidified filling material 118.

In certain embodiments, the solidified filling material 116 is stiffer (i.e., harder) than the solidified filling material 118. In other embodiments, the solidified filling materials 116 and 118 are the same material. In certain embodiments, the solidified filling material 116 is a relatively hard material (e.g., hard epoxy) and the protective transition member 68 is also a relatively hard material (e.g., a thermo-set plastic). In other embodiments, the solidified filling material 116 is a relatively soft material (e.g., the polyurethane foam) and the protective transition member 68 is the relatively hard material. In still other embodiments, the solidified filling material 116 is the relatively hard material and the protective transition member 68 is a relatively soft material (e.g., a rubber).

The optical fibers 72 of the main fiber optic cable 54 can be a first type of optical fiber, and at least one of the optical fibers 56, 156 of the pre-connectorized fiber optic cable assembly 52, 152 can be a second type of optical fiber. The first type of optical fiber can be lower in cost than the second type of optical fiber. The second type of optical fiber can be performance matched to the fiber optic connector 58, 158 terminating the second type of optical fibers.

The present disclosure also relates to a method of making the fiber optic cable assembly 50, 150. The method includes selecting and providing the main fiber optic cable 54, selecting and providing the pre-connectorized fiber optic cable assembly 52, 152, mass fusion splicing the proximal ends 86 of the optical fibers 56, 156 of the pre-connectorized fiber optic cable assembly 52, 152 to the end 82 of the optical fibers 72 of the main fiber optic cable 54 thereby forming the mass fusion splice 66, positioning the mass fusion splice 66 within the outer jacket 70 of the main fiber optic cable 54, applying the reinforcing member 64 to the outer jacket 70 of the main fiber optic cable 54 with the reinforcing member 64 positioned over the mass fusion splice 66, and applying the protective transition member 68 to the main fiber optic cable 54 and the pre-connectorized fiber optic cable assembly 52, 152.

The method can further include pre-applying the protective transition member 68 to the main fiber optic cable 54 and pre-applying the reinforcing member 64 to the main fiber optic cable 54. The method can further include opening the end 110 of the outer jacket 70 of the main fiber optic cable 54 before forming the mass fusion splice 66 and closing the end 110 after forming the mass fusion splice 66. The method can further include UV recoating the mass fusion splice 66 after forming the mass fusion splice 66. The method can further include removing various tubes, water swellable yarns, and central member coatings from within the longitudinal portion 102 of the outer jacket 70 of the main fiber optic cable 54. The method can further include filling or partially filling the interior 120 of the longitudinal portion 102 of the outer jacket 70 of the main fiber optic cable 54 with the solidified filling material 118. The method can further include filling or partially filling the interior 114 of the protective transition member 68 with the solidified filling material 116. Selecting and providing the main fiber optic cable 54 can be done independently of selecting and providing the pre-connectorized fiber optic cable assembly 52, 152.

A sequence of an example method is illustrated sequentially in the figures beginning with the main fiber optic cable 54, shown at FIGS. 1-3, and ending with the example fiber optic cable assembly 50, shown at FIGS. 28-30.

FIG. 39 illustrates the other example protective transition member 168. The protective transition member 168 is similar to the protective transition member 68, described above. The similarities include: 1) the protective transition member 168 or a base 176 of the protective transition member 168 can be pre-positioned over the main fiber optic cable 54; 2) the protective transition member 168 or the base 176 of the protective transition member 168 can be pre-positioned before the longitudinal cuts 108 are made on the outer jacket 70; 3) the protective transition member 168 can be positioned over the first end 78 of the main fiber optic cable 54 after the splice 66 is made between the ends 86 of the optical fibers 56, 156 and the ends 82 of the optical fibers 72; 4) the protective transition member 168 can be positioned over the first end 78 of the main fiber optic cable 54 after the reinforcing member 64 is positioned over the longitudinal cuts 108; 5) the protective transition member 168 can be positioned around the portion 112 of the pre-connectorized fiber optic cable assembly 52, 152; 6) an interior 214 (see FIGS. 40 and 41) of the protective transition member 168 can be at least partially filled with the solidifying filling material 116, 118; and 7) the attachments/connections/securement between the solidified filing materials 116, 118, the strength members 74, 96, the cable 54, and the pre-connectorized fiber optic cable assemblies 52, 152.

The protective transition member 168 can include a housing portion 170 and a cylindrical portion 172. The strength reinforcements 94, 294 can be housed within the housing portion 170. An inner diameter 174 of the cylindrical portion 172 can be sized to fit over the reinforcing member 64. Alternatively, the inner diameter 174 can be sized to fit over the jacket 70 of the main fiber optic cable 54. In embodiments where the main fiber optic cable 54 is non-cylindrical, the cylindrical portion 172 can be replaced with a non-cylindrical portion, and the inner diameter 174 can be replaced with a shape that matches the non-cylindrical cable. In the depicted embodiment, the cylindrical portion 172 is preferably positioned adjacent and around the first end 78 of the main fiber optic cable 54, and the cylindrical portion 172 overlaps a portion of the cable 54. In the depicted embodiment, the housing portion 170 is preferably positioned beyond the first end 78 of the main fiber optic cable 54.

In a preferred embodiment, the protective transition member 168 is made of a Celanex® thermoplastic polyester available from Ticona of Summit, N.J., USA. In particular, Celanex® 3216, that is flame retardant and includes 15% Glass-fiber, is used.

As depicted, the protective transition member 168 includes the base 176 (see FIGS. 40 and 41), a cover 178 (see FIGS. 42 and 43), and a selected cable support member 180, 180', 280, 380 (see FIGS. 32 and 44-48). The base 176 includes one or more attachment members 182, the cylindrical portion 172, a cavity 184, and a retaining structure 186. The cover 178 includes a lid 188, one or more attachment members 190, and a retainer 192. The protective transition member 168 is assembled by inserting one of the cable support members (e.g., cable support blocks) 180, 180', 280, 380 into the retaining structure 186 of the base 176 and attaching the cover 178 to the base 176. In the depicted embodiment, the cavity 184, the lid 188, and the cable support member 180, 180', 280, 380 define boundaries for the interior 214 of the protective transition member 168. The attachment members 182 of the base 176 are channel-like and receive the attachment members 190 of the cover 178 to attach the cover 178 to the base 176. The retaining structure 186 of the base 176 includes a pair of channels 194 that captures flanges 196 of the cable support block 180, 180', 280, 380 when the flanges 196 are slid into the channels 194. A first end 198 of the cable support member 180, 180', 280, 380 abuts a stop 200 of the base 176, and the retainer 192 of the cover 178 abuts a second end 202 of the cable support block 180, 180', 280, 380 when the cover 178 is attached to the base 176.

The cable support member 180, 180', 280, 380 includes a plurality of holes 206. As depicted, the holes 206 are cylindrical and/or oblong. The holes 206 can be arranged in one or more rows 208 of holes 206 (see FIG. 44). In the depicted embodiments at FIGS. 44-46, three rows 208 of six holes 206 each are arranged in a rectangular grid. In the depicted embodiment at FIG. 32, three rows 208 of twelve holes 206 each are arranged in a rectangular grid. In other embodiments, the holes 206 can be arranged in other arrangements. In certain embodiments, the number of the rows 208 in the cable support member 180, 180', 280, 380 is equal to the number of the fiber ribbons 76 in the main fiber optic cable 54. In certain embodiments, the optical fibers 72 of a given fiber ribbon 76 of the main fiber optic cable 54 correspond with a given row 208 of the cable support member 180, 180', 280, 380 (i.e., the fibers 72 of the given ribbonized fibers 76 pass through the holes 206 of the given row 208). In certain embodiments, a quantity of the holes 206 in a given row 208 of the cable support block 180, 180', 280 is equal to a quantity of the optical fibers 72 of each of the fiber ribbons 76 of the main fiber optic cable 54.

The holes 206 can each receive one of the jackets 88, 288 of the fiber optic cables 60, 160 of the pre-connectorized fiber optic cable assemblies 52, 152. The cable support member 180, 180', 280, 380 can be preassembled on the pre-connectorized fiber optic cable assembly 52, 152 or assemblies 52, 152 (e.g., before the fiber optic connectors 58, 158 are attached and/or before the cable assembly 52, 152 is joined to the main cable 54). The cable support member 180, 180', 280, 380 can be positioned between the fiber optic connectors 58, 158 and the strength reinforcements 94, 294 (see FIG. 32). In embodiments that include single-fiber fiber optic connectors 58, a single one of the optical fibers 56 can pass through each of the corresponding holes 206. In embodiments that include multi-fiber fiber optic connectors 158, a plurality of the optical fibers 156 can pass through each of the corresponding holes 206. In embodiments that include the multi-fiber fiber optic connectors 158, the holes 206 can be non-cylindrical. In embodiments that include both single-fiber and multi-fiber fiber optic connectors 58, 158, certain holes 206 can hold a plurality of the optical fibers 156 and other holes 206 can hold a single one of the optical fibers 56.

The solidifying filing materials 116, 118 can be injected and/or applied into the interior 214 of the protective transition member 168 when the cover 178 is removed from the base 176. The solidifying filing material 118 can be injected and/or applied into the interior 120 of the longitudinal portion 102 of the outer jacket 70 via the base 176 when the cover 178 is removed from the base 176. The cover 178 can be attached to the base 176 after the filing materials 116, 118 are applied and/or injected into the interiors 120 and/or 214.

As discussed above, the protective transition member 68, 168 can include the solidified filling material 116. The solidified filling material 116 can conform to the jackets 88, 288 of one or more of the cables 60, 160. Other protective transition members can include features that individually conform to the jackets 88, 288 of one or more of the cables 60, 160. FIGS. 45-48 illustrate the cable support members 280 and 380 that are adapted to be mounted between the base 176 and the cover 178 of the protective transition member 168. The cable support members 180, 180', 280, and 380 are interchangeable within the protective transition member 168. The protective transition member 168 can thereby be customized to attach to and/or conform to various quantities and types of fiber optic cables including the fiber optic cables 60, 160. As various cable support members including the cable support members 180, 180', 280, and 380 can be inserted between the same base 176 and cover 178, a variety of fiber optic cable assemblies with a variety of quantities and types of fiber optic cables can be made using the same base 176 and cover 178.

The cable support members 180, 180', 280, and 380 can be made of a flexible and/or resilient material such as rubber. The cable support members 180, 180', 280, and 380 can include one or more strain relief members 284, 384 (see FIGS. 45-48). The strain relief members 284, 384 can provide strain-relief to the fiber optic cables 60, 160. The strain relief members 284, 384 can be made of a flexible and/or resilient material such as rubber. As illustrated, the strain relief member 284 is adapted to provide strain-relief to a single fiber cable such as the fiber optic cable 60, and the strain relief member 384 is adapted to provide strain-relief to a multi-fiber cable such as the fiber optic cable 160.

FIGS. 49-51 illustrate the fiber optic cable assembly 150. The fiber optic cable assembly 150 is similar to the fiber optic cable assembly 50 but includes the multi-fiber cable 160, included within the pre-connectorized fiber optic cable assembly 152, along with the single fiber cables 60, included within the pre-connectorized fiber optic cable assembly 52. In general, any combination of fiber optic cable types can be included within a pre-connectorized fiber optic cable assembly (e.g., several different types of single fiber cables and one or more types of multi-fiber cable can be included together in the same pre-connectorized fiber optic cable assembly). The optical fibers 72 of a given fiber ribbon 76 of the main fiber optic cable 54 can be joined (e.g., mass fusion spliced) to one or more of the ribbonized portions 92 of one or more of the pre-connectorized fiber optic cable assemblies 52 and/or 152. Likewise, the optical fibers 56, 156 of a given ribbonized portion 92 of the pre-connectorized fiber optic cable assembly 52 or 152 can be joined (e.g., mass fusion spliced) to one or more of the fiber ribbons 76 or portions of the fiber ribbons 76 of the main fiber optic cable 54.

FIG. 51 illustrates a cable support member 180". The cable support member 180" is similar to the cable support members 180, 180', 280, and 380 but is adapted to mount to the protective transition member 68 of the fiber optic cable assembly 50, 150. As with the cable support members 180, 180', 280, and 380, the cable support member 180" can be preassembled to the pre-connectorized fiber optic cable assemblies 52 and/or 152. As with the various cable support members adapted for mounting to the protective transition member 168, various cable support members can be made for the protective transition member 68. The various cable support members for the protective transition member 68 allows various fiber optic cable assemblies to be made by switching in and out various pre-connectorized fiber optic cable assemblies and cable support members. The filing materials 116, 118 can be included in the fiber optic cable assembly 150, as they can be included in the fiber optic cable assembly 50. FIGS. 49-51 do not illustrate the filling materials 116, 118.

From the forgoing detailed description, it will be evident that modifications and variations can be made in the devices and methods of the disclosure without departing from the spirit or scope of the invention.

What is claimed is:

1. A fiber optic cable assembly comprising:
a main fiber optic cable including an outer jacket, a plurality of optical fibers surrounded by the outer jacket, and at least one strength member surrounded by the outer jacket, the main fiber optic cable extending from a first end to a second end, the optical fibers of the main fiber optic cable having ends positioned adjacent to the first end of the main fiber optic cable;
a pre-connectorized fiber optic cable assembly including a plurality of optical fibers and at least one fiber optic connector, the optical fibers of the plurality of optical fibers of the pre-connectorized fiber optic cable assembly having distal ends and proximal ends, the distal ends being terminated by the at least one fiber optic connector and the proximal ends adapted for mass fusion splicing;
a reinforcing member positioned around a longitudinal portion of the outer jacket of the main fiber optic cable;
a mass fusion splice optically joining the proximal ends of the optical fibers of the plurality of optical fibers of the pre-connectorized fiber optic cable assembly to the ends of the optical fibers of the main fiber optic cable, the mass fusion splice positioned within the reinforcing member and within the outer jacket of the main fiber optic cable; and
a protective transition member positioned over the first end of the main fiber optic cable and positioned around a portion of the pre-connectorized fiber optic cable assembly, an interior of the protective transition member being at least partially filled with a first solidified filling material.

2. The fiber optic cable assembly of claim 1, wherein the first solidified filling material is an epoxy.

3. The fiber optic cable assembly of claim 1, wherein the pre-connectorized fiber optic cable assembly includes a plurality of single fiber cables, each of the optical fibers of the plurality of optical fibers of the pre-connectorized fiber optic cable assembly being positioned within a single fiber jacket of one of the single fiber cables.

4. The fiber optic cable assembly of claim 3, wherein the single fiber jackets of the single fiber cables are secured to the main fiber optic cable by the first solidified filling material.

5. The fiber optic cable assembly of claim 3, wherein strength members of the single fiber cables are secured to the main fiber optic cable by the first solidified filling material.

6. The fiber optic cable assembly of claim 3, wherein the pre-connectorized fiber optic cable assembly includes a ribbonized portion with no single fiber jacket positioned around the optical fibers of the plurality of optical fibers of the pre-connectorized fiber optic cable assembly and wherein the pre-connectorized fiber optic cable assembly also includes a jacketed portion.

7. The fiber optic cable assembly of claim 4, wherein the pre-connectorized fiber optic cable assembly includes a ribbonized portion with no single fiber jacket positioned around the optical fibers of the plurality of optical fibers of the pre-connectorized fiber optic cable assembly and wherein the pre-connectorized fiber optic cable assembly also includes a jacketed portion.

8. The fiber optic cable assembly of claim 5, wherein the pre-connectorized fiber optic cable assembly includes a ribbonized portion with no single fiber jacket positioned around the optical fibers of the plurality of optical fibers of the pre-connectorized fiber optic cable assembly and wherein the pre-connectorized fiber optic cable assembly also includes a jacketed portion.

9. The fiber optic cable assembly of claim 6, wherein the pre-connectorized fiber optic cable assembly includes a strength reinforcement between the ribbonized portion and the jacketed portion.

10. The fiber optic cable assembly of claim 3, wherein the optical fibers of the plurality of optical fibers of the main fiber optic cable are positioned within tubes of the main fiber optic cable, wherein the tubes are positioned within the outer jacket of the main fiber optic cable, and wherein the single fiber jackets of the single fiber cables are higher in mechanical strength than the tubes.

11. The fiber optic cable assembly of claim 1, further comprising a second solidified filling material at least partially filling an interior of the longitudinal portion of the outer jacket that is positioned within the reinforcing member.

12. The fiber optic cable assembly of claim 11, wherein the second solidified filling material is a polyurethane foam.

13. The fiber optic cable assembly of claim 11, wherein the mass fusion splice is positioned within the second solidified filling material.

14. The fiber optic cable assembly of claim 11, wherein the at least one strength member of the main fiber optic cable is secured to the second solidified filling material.

15. The fiber optic cable assembly of claim 1, wherein the longitudinal portion of the outer jacket of the main fiber optic cable includes at least one cut extending from an end of the outer jacket, the at least one cut adapted to allow access to within the outer jacket for forming the mass fusion splice when the fiber optic cable assembly is being manufactured.

16. The fiber optic cable assembly of claim 15, wherein the at least one cut includes four longitudinal cuts.

17. The fiber optic cable assembly of claim 16, wherein the four longitudinal cuts are substantially circumferentially equally spaced about the outer jacket of the main fiber optic cable.

18. The fiber optic cable assembly of claim 1, wherein the plurality of optical fibers of the main fiber optic cable are a first type of optical fiber and wherein at least one of the optical fibers of the plurality of optical fibers of the pre-connectorized fiber optic cable assembly are a second type of optical fiber.

19. The fiber optic cable assembly of claim 18, wherein the first type of optical fiber is lower in cost than the second type of optical fiber.

20. The fiber optic cable assembly of claim 18, wherein the second type of optical fiber is performance matched to the fiber optic connector terminating the second type of optical fibers of the pre-connectorized fiber optic cable assembly.

21. The fiber optic cable assembly of claim 1, wherein the reinforcing member is a heat shrink tube.

22. The fiber optic cable assembly of claim 21, wherein the heat shrink tube is a thick-walled heat shrink tube.

23. The fiber optic cable assembly of claim 1, wherein the mass fusion splice includes a UV re-coating.

24. A fiber optic cable assembly comprising:
a main fiber optic cable including an outer jacket, a plurality of optical fibers surrounded by the outer jacket, and at least one strength member surrounded by the outer jacket, the main fiber optic cable extending from a first end to a second end, the optical fibers of the main fiber optic cable having ends positioned adjacent to the first end of the main fiber optic cable;
a pre-connectorized fiber optic cable assembly including a plurality of optical fibers and at least one fiber optic connector, the optical fibers of the plurality of optical fibers of the pre-connectorized fiber optic cable assembly having distal ends and proximal ends, the distal ends being terminated by the at least one fiber optic connector and the proximal ends adapted for mass fusion splicing;
a reinforcing member positioned around a longitudinal portion of the outer jacket of the main fiber optic cable; and
a mass fusion splice optically joining the proximal ends of the optical fibers of the plurality of optical fibers of the pre-connectorized fiber optic cable assembly to the ends of the optical fibers of the main fiber optic cable, the mass fusion splice positioned within the reinforcing member and within the outer jacket of the main fiber optic cable.

25. A method of making a fiber optic cable assembly, the method comprising:
selecting and providing a main fiber optic cable, the main fiber optic cable including an outer jacket, a plurality of optical fibers surrounded by the outer jacket, and at least one strength member surrounded by the outer jacket, the main fiber optic cable extending from a first end to a second end, the plurality of optical fibers of the main fiber optic cable having an end positioned adjacent to the first end of the main fiber optic cable;
selecting and providing a pre-connectorized fiber optic cable assembly, the pre-connectorized fiber optic cable assembly including a plurality of optical fibers and at least one fiber optic connector, the optical fibers of the plurality of optical fibers of the pre-connectorized fiber optic cable assembly having distal ends and proximal ends, the distal ends being terminated by the at least one fiber optic connector and the proximal ends adapted for mass fusion splicing;
mass fusion splicing the proximal ends of the optical fibers of the plurality of optical fibers of the pre-connectorized fiber optic cable assembly to the end of the plurality of optical fibers of the main fiber optic cable thereby forming a mass fusion splice;
positioning the mass fusion splice within the outer jacket of the main fiber optic cable;
applying a reinforcing member to the outer jacket of the main fiber optic cable, the reinforcing member extending from a first end to a second end, the reinforcing member positioned around a longitudinal portion of the outer jacket of the main fiber optic cable, the first end of the reinforcing member positioned nearer to the first end of the main fiber optic cable than the second end of the reinforcing member, the second end of the reinforcing member positioned nearer to the second end of the main fiber optic cable than the first end of the reinforcing member, and the reinforcing member positioned over the mass fusion splice; and
applying a protective transition member to the main fiber optic cable and the pre-connectorized fiber optic cable assembly, the protective transition member positioned over the first end of the main fiber optic cable and positioned around a portion of the pre-connectorized fiber optic cable assembly, an interior of the protective transition member being at least partially filled with a first solidified filling material.

26. The method of claim 25, further comprising pre-applying the protective transition member to the main fiber optic cable and pre-applying the reinforcing member to the main fiber optic cable.

27. The method of claim 25, further comprising opening an end of the outer jacket of the main fiber optic cable before forming the mass fusion splice and closing the end of the outer jacket after forming the mass fusion splice.

28. The method of claim 25, further comprising UV recoating the mass fusion splice after forming the mass fusion splice.

29. The method of claim 25, wherein selecting and providing the main fiber optic cable is done independently of selecting and providing the pre-connectorized fiber optic cable assembly.

* * * * *